(12) United States Patent
Yoon et al.

(10) Patent No.: US 11,320,963 B2
(45) Date of Patent: May 3, 2022

(54) DISPLAY DEVICE AND OPERATING METHOD THEREOF

(71) Applicant: Samsung Electronics Co., Ltd., Suwon-si (KR)

(72) Inventors: Sukun Yoon, Suwon-si (KR); Jinho Kim, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

(21) Appl. No.: 16/953,951

(22) Filed: Nov. 20, 2020

(65) Prior Publication Data

US 2021/0149532 A1 May 20, 2021

(30) Foreign Application Priority Data

Nov. 20, 2019 (KR) .......................... 10-2019-0149892

(51) Int. Cl.
*G06F 3/0482* (2013.01)
*G06F 3/04847* (2022.01)
(Continued)

(52) U.S. Cl.
CPC ........ *G06F 3/0482* (2013.01); *G06F 3/04847* (2013.01); *G06F 13/102* (2013.01); *G08C 23/04* (2013.01); *H04W 12/06* (2013.01)

(58) Field of Classification Search
CPC .................................................... G06F 3/0482
(Continued)

(56) References Cited

U.S. PATENT DOCUMENTS 7,685,524 B2 * 3/2010 Rekimoto ............. G06F 3/0481
  701/408
9,847,569 B2 * 12/2017 Zakaria .................... H01Q 1/22
(Continued)

FOREIGN PATENT DOCUMENTS

KR   10-2016-0006832      1/2016
KR   10-1720778           3/2017
(Continued)

OTHER PUBLICATIONS

International Search Report and Written Opinion dated Feb. 23, 2021 in corresponding International Application No. PCT/KR2020/016498.

*Primary Examiner* — Reza Nabi
(74) *Attorney, Agent, or Firm* — Nixon & Vanderhye, P.C.

(57) ABSTRACT

A display device includes a display, a communicator comprising communication circuitry configured to search for one or more peripheral devices, a memory storing one or more instructions, and a processor configured to execute the one or more instructions stored in the memory, wherein the processor is further configured to execute the one or more instructions to: control the display to display one or more found peripheral devices, and based on receiving a network setting request regarding a first peripheral device of the one or more found peripheral devices, generate a Quick Response (QR) code including connection information about the first peripheral device, control the display to display the QR code, and based on the network setting of the first peripheral device being completed through the QR code, control the first peripheral device through a set network.

13 Claims, 21 Drawing Sheets

(51) Int. Cl.
*G06F 13/10* (2006.01)
*H04W 12/06* (2021.01)
*G08C 23/04* (2006.01)

(58) Field of Classification Search
USPC .......................................................... 715/736
See application file for complete search history.

(56) References Cited

U.S. PATENT DOCUMENTS

| | | | | |
|---|---|---|---|---|
| 9,912,772 | B2* | 3/2018 | Graham | H04L 67/26 |
| 9,974,015 | B2* | 5/2018 | Zakaria | H04W 4/80 |
| 10,212,110 | B2 | 2/2019 | Lee et al. | |
| 10,734,703 | B2* | 8/2020 | Bartlett | H01Q 9/0407 |
| 10,805,155 | B1* | 10/2020 | Le | H04L 67/025 |
| 10,997,797 | B2* | 5/2021 | Vossoughi | H04W 4/42 |
| 11,095,503 | B2* | 8/2021 | Bartlett | H04W 12/50 |
| 2009/0137256 | A1* | 5/2009 | Karaoguz | H04L 67/16 455/456.6 |
| 2013/0155173 | A1* | 6/2013 | Brady | H04M 3/567 348/E7.083 |
| 2013/0167035 | A1* | 6/2013 | Imes | F24F 11/30 715/736 |
| 2014/0176310 | A1* | 6/2014 | Kotlicki | G08C 17/02 340/12.5 |
| 2014/0266669 | A1* | 9/2014 | Fadell | G08B 19/00 340/501 |
| 2014/0317514 | A1* | 10/2014 | Bokotey | G06F 3/04845 715/736 |
| 2015/0145643 | A1* | 5/2015 | Fadell | G08B 29/185 340/5.51 |
| 2015/0156031 | A1* | 6/2015 | Fadell | G08B 29/185 700/90 |
| 2016/0294828 | A1* | 10/2016 | Zakaria | H04W 4/24 |
| 2016/0295364 | A1* | 10/2016 | Zakaria | H04L 67/12 |
| 2016/0381144 | A1* | 12/2016 | Malik | H04L 67/125 455/517 |
| 2017/0169264 | A1* | 6/2017 | Britt | H04L 67/025 |
| 2017/0169640 | A1* | 6/2017 | Britt | G06F 21/35 |
| 2017/0169688 | A1* | 6/2017 | Britt | G08B 25/10 |
| 2017/0171181 | A1* | 6/2017 | Britt | H04W 12/03 |
| 2017/0171204 | A1* | 6/2017 | Forood | H04W 4/80 |
| 2017/0171314 | A1* | 6/2017 | Britt | G06Q 20/308 |
| 2017/0195318 | A1* | 7/2017 | Liu | H04L 67/10 |
| 2017/0208363 | A1* | 7/2017 | Glazier | H04N 21/41407 |
| 2017/0208364 | A1* | 7/2017 | Glazier | H04N 21/44227 |
| 2017/0244574 | A1* | 8/2017 | Moon | H04L 41/22 |
| 2017/0279631 | A1* | 9/2017 | Britt | H05B 6/668 |
| 2017/0344974 | A1* | 11/2017 | Britt | H04W 4/70 |
| 2018/0176970 | A1* | 6/2018 | Gupta | H04L 67/306 |
| 2018/0220476 | A1* | 8/2018 | Jung | H04L 12/2869 |
| 2019/0197279 | A1* | 6/2019 | Wang | G06K 7/1417 |
| 2019/0220264 | A1* | 7/2019 | Yoon | H04L 69/18 |
| 2019/0253243 | A1* | 8/2019 | Zimmerman | H04W 4/70 |
| 2019/0268661 | A1* | 8/2019 | Park | H04N 21/4131 |
| 2020/0169427 | A1* | 5/2020 | Wu | H04M 1/72412 |
| 2020/0169460 | A1* | 5/2020 | Bartlett | H04W 4/70 |
| 2020/0178169 | A1* | 6/2020 | Luo | H04W 12/06 |
| 2020/0186985 | A1* | 6/2020 | Dinata | H04W 76/10 |
| 2020/0329426 | A1* | 10/2020 | Jin | H04W 4/80 |
| 2020/0333756 | A1* | 10/2020 | Weik, III | G05B 19/0426 |
| 2020/0366516 | A1 | 11/2020 | Moon et al. | |
| 2021/0029543 | A1* | 1/2021 | Nam | H04W 12/06 |
| 2021/0042730 | A1* | 2/2021 | Lee | G06Q 20/208 |
| 2021/0124180 | A1* | 4/2021 | Amadio | G02B 27/0093 |
| 2021/0149532 | A1* | 5/2021 | Yoon | G06F 3/04847 |
| 2021/0258402 | A1* | 8/2021 | Jywe | H04L 67/125 |
| 2022/0012328 | A1* | 1/2022 | Hyldgaard | G06K 7/1417 |

FOREIGN PATENT DOCUMENTS

| | | |
|---|---|---|
| KR | 10-2017-0097835 | 8/2017 |
| KR | 10-1843355 | 3/2018 |

* cited by examiner

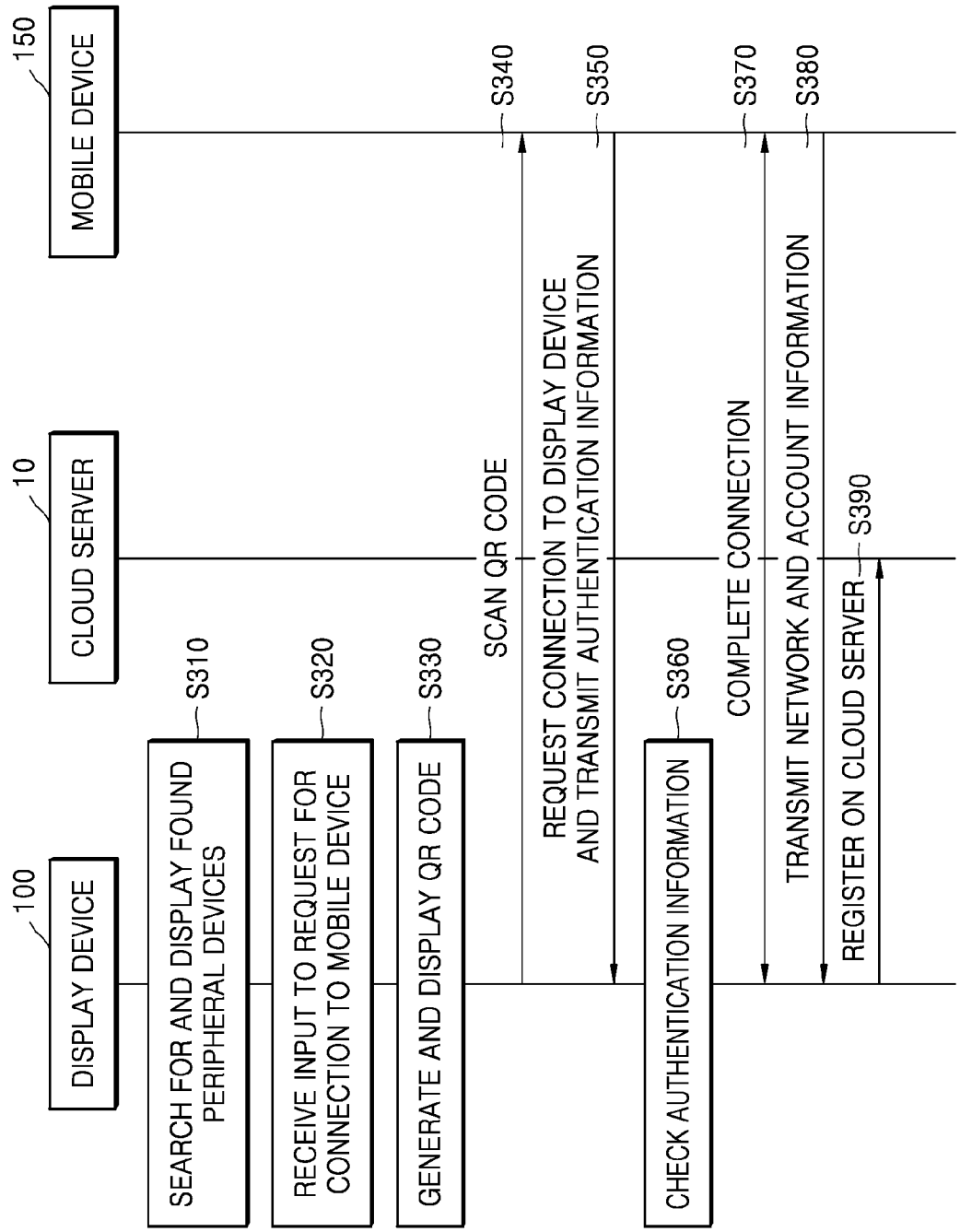

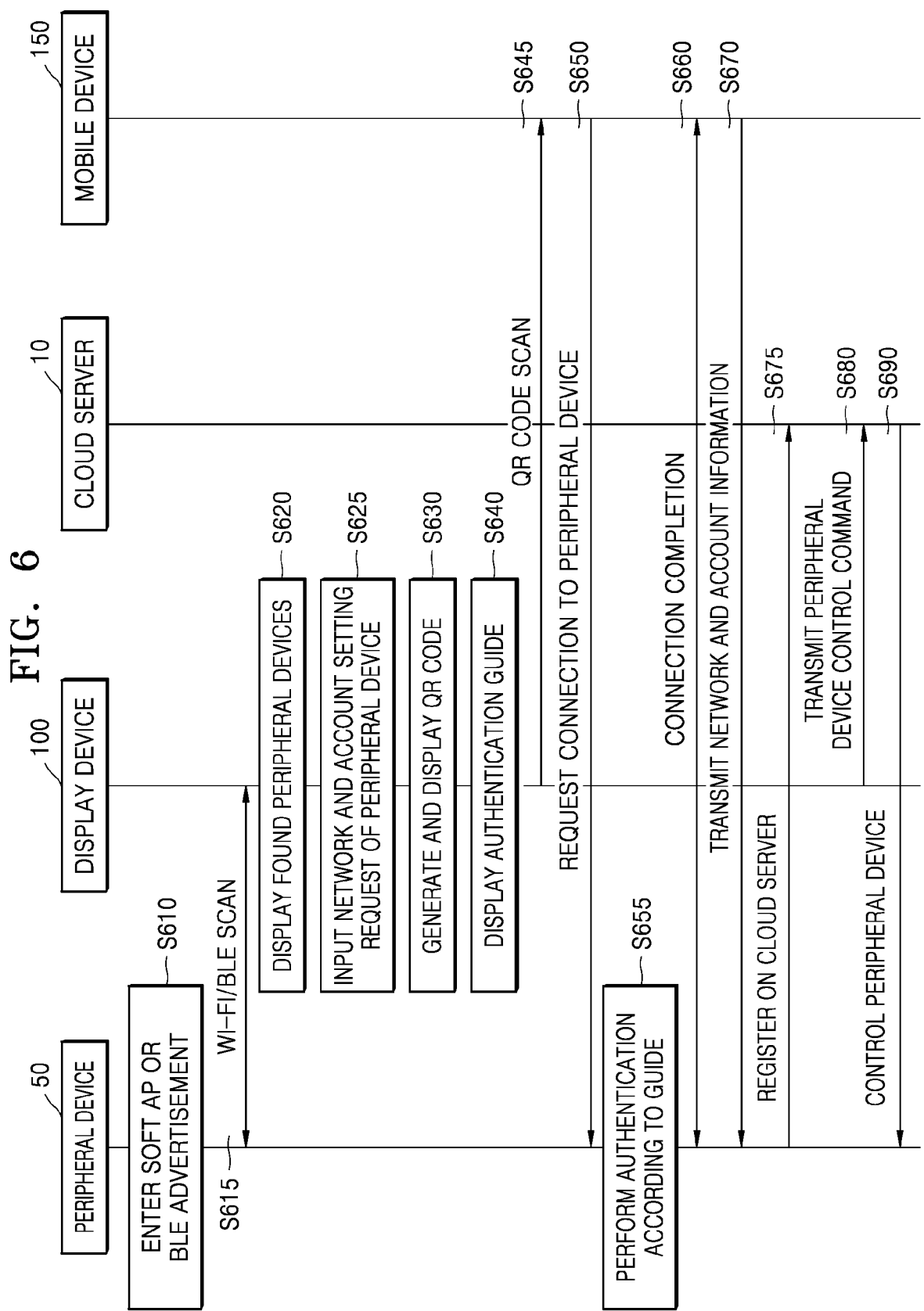

DISPLAY DEVICE AND OPERATING METHOD THEREOF

CROSS-REFERENCE TO RELATED APPLICATION

This application is based on and claims priority under 35 U.S.C. § 119 to Korean Patent Application No. 10-2019-0149892, filed on Nov. 20, 2019, in the Korean Intellectual Property Office, the disclosure of which is incorporated by reference herein in its entirety.

BACKGROUND

1. Field

The disclosure relates to a display device and an operating method thereof, and for example, to a display device capable of searching for peripheral devices and supporting network and account settings of found peripheral devices, and an operating method thereof.

2. Description of Related Art

The Internet of Things (IoT) may refer, for example, to all objects, for example, electronic devices or the like, including display devices such as TVs, smartphones, personal computers (PCs), cars, refrigerators, washing machines, watches or the like being connected to a wireless network. When the IoT is used, it becomes possible for a plurality of electronic devices to exchange and process data so as to be automatically operated. For example, a user may use a TV or a smartphone to control home appliances.

Electronic devices equipped with IoT functions need to be registered on an IoT cloud server to implement an IoT environment, and network and account settings are necessary to be registered on the IoT cloud server. However, there is a problem in that it is not easy for home appliances without a display to set up a network and an account.

SUMMARY

Embodiments of the disclosure provide a display device which may easily perform network and account settings of peripheral devices using connection information of the peripheral devices found by the display device, and an operating method thereof.

Additional aspects will be set forth in part in the description which follows and, in part, will be apparent from the description.

According to an example embodiment of the disclosure, a display device includes: a display, a communicator comprising circuitry configured to search for one or more peripheral devices, a memory storing one or more instructions, and a processor configured to execute the one or more instructions stored in the memory, wherein the processor is further configured to execute the one or more instructions to: control the display to display one or more found peripheral devices, and based on receiving a network setting request regarding a first peripheral device of the one or more found peripheral devices, generate a Quick Response (QR) code including connection information about the first peripheral device, control the display to display the QR code, and based on the network setting of the first peripheral device being completed through the QR code, control the first peripheral device through the set network.

According to an example embodiment of the disclosure, the connection information about the first peripheral device may include Media Access Control (MAC) address information of the first peripheral device and a device name of the first peripheral device.

According to an example embodiment of the disclosure, the processor may be further configured to execute the one or more instructions to: determine display positions of the peripheral devices based on Received Signal Strength Indicator (RSSI) values of signals received from the one or more found peripheral devices.

According to an example embodiment of the disclosure, the processor may be further configured to execute the one or more instructions to: control the display to display a connection state between each of the one or more found peripheral devices and the display device.

According to an example embodiment of the disclosure, the processor may be further configured to execute the one or more instructions to: receive, from the first peripheral device, guide information to authenticate a connection to the first peripheral device, and provide a guide to authenticate the connection to the first peripheral device based on the guide information.

According to an example embodiment of the disclosure, the processor may be further configured to execute the one or more instructions to: identify infrared (IR) control code information corresponding to the first peripheral device, and generate an IR control signal corresponding to the connection authentication to the first peripheral device based on the identified IR control code information and control the communicator to transmit the generated IR control signal to the first peripheral device.

According to an example embodiment of the disclosure, the processor may be further configured to execute the one or more instructions to: control the display to display a registration completion message based on the network setting of the first peripheral device being completed and the first peripheral device being registered on a cloud server.

According to an example embodiment of the disclosure, the processor may be further configured to execute the one or more instructions to: control the display to display a menu list to control the first peripheral device based on the network setting of the first peripheral device being completed.

According to an example embodiment of the disclosure, the processor may be further configured to execute the one or more instructions to: control the communicator to transmit a connection request to the first peripheral device based on the connection information, generate an IR control signal for connection authentication to the first peripheral device based on the IR control code information corresponding to the first peripheral device, transmit the IR control signal to the first peripheral device, and based on the connection to the first peripheral device being authenticated, control the communicator to transmit network and account information to the first peripheral device.

According to an example embodiment of the disclosure, a method of operating a display device includes: searching for one or more peripheral devices, displaying one or more found peripheral devices, based on a network setting regarding a first peripheral device among the one or more peripheral devices being received, generating a QR code including connection information about the first peripheral device and displaying the QR code, and based on the network setting of the first peripheral device being completed based on the QR code, controlling the first peripheral device through a set network.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 3 is a signal flow diagram illustrating an example method of registering a display device on a cloud server, according to various embodiments;

FIG. 6 is a signal flow diagram illustrating an example method of registering a peripheral device on a cloud server by a display device, according to various embodiments;

DETAILED DESCRIPTION

Figure 1:
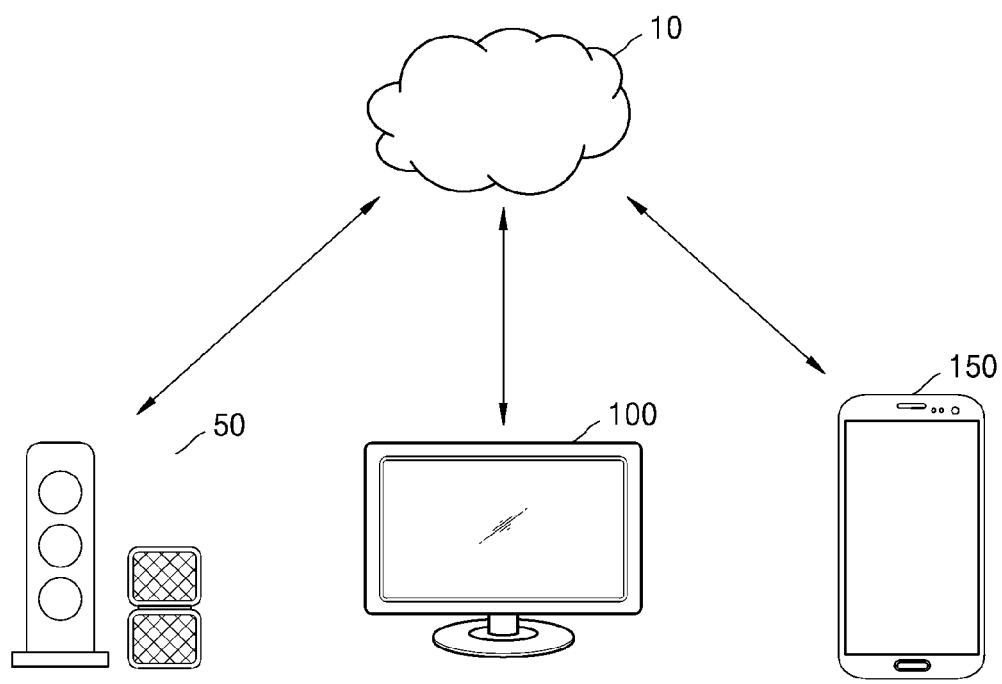
FIG. 1 is a diagram illustrating an example cloud system according to various embodiments.

The terms used in the disclosure are briefly described and the disclosure is described in greater detail below.

The terms used in the disclosure have been selected from currently widely used general terms in consideration of the functions in the disclosure. However, the terms may vary according to the intention of one of ordinary skill in the art, case precedents, and the advent of new technologies. Also, for special cases, meanings of the terms may be arbitrarily selected and are described in detail in the disclosure. Accordingly, the terms used in the disclosure are defined based on their meanings in relation to the contents discussed throughout the disclosure, not by their simple meanings.

When a part may "include" a certain element, unless specified otherwise, it may not be construed to exclude another element but may be construed to further include other elements. Furthermore, terms such as "~portion," "~unit," "~module," and "~block" stated in the disclosure may signify a unit to process at least one function or operation and the unit may be embodied by hardware, software, or a combination of hardware and software.

Throughout the disclosure, the expression "at least one of a, b or c" indicates only a, only b, only c, both a and b, both a and c, both b and c, all of a, b, and c, or variations thereof.

In an embodiment of the disclosure, the term "user" may refer to a person who controls the function or operation of home appliances or peripheral devices, a display device, and a mobile device, and may include an administrator or an installation engineer.

Embodiments are provided to explain the disclosure to one of ordinary skill in the art to which the disclosure pertains. However, the disclosure is not limited thereto and it will be understood that various changes in form and details may be made therein. In the following description, when detailed descriptions about related well-known functions or structures are determined to make the gist of the disclosure unclear, the detailed descriptions may be omitted. Throughout the drawings, like reference numerals denote like elements.

FIG. 1 is a diagram illustrating an example cloud system according to various embodiments.

Referring to FIG. 1, a cloud system according to an embodiment of the disclosure may include a cloud server 10 that connects a home appliance 50, a display device 100, and a mobile device 150 to one another. The cloud server 10 according to an embodiment of the disclosure may be an IoT cloud server.

The home appliance 50 according to an embodiment of the disclosure may be home appliances such as a refrigerator, a washing machine, an air conditioner, a vacuum cleaner, a lamp, an air purifier, and the like, but the disclosure is not limited thereto, and the home appliance 50 may be implemented in various forms of a TV, a mobile phone, a tablet PC, a digital camera, a camcorder, a laptop computer, a tablet PC, a desktop computer, an E-book reader, a digital broadcast receiver, a personal digital assistant (PDA), a portable multimedia player (PMP), a navigation device, an MP3 player, a wearable device, and the like.

Furthermore, the display device 100 according to an embodiment of the disclosure, which is an electronic device including a display, may be implemented in various forms such as a TV, a mobile phone, a tablet PC, a digital camera, a camcorder, a laptop computer, a tablet PC, a desktop computer, an E-book reader, a digital broadcast receiver, a PDA, a PMP, a navigation device, an MP3 player, a wearable device, and the like. Furthermore, the display device 100 may be a stationary electronic device disposed at a fixed position or a portable electronic device having a portable form, or a digital broadcast receiver capable of receiving broadcast. In particular, although embodiments of the disclosure may be easily implemented in a display device having a large display such as a TV, the disclosure is not limited thereto.

The mobile device 150 according to an embodiment of the disclosure may include a mobile computing device such as a wearable device, a smart phone, a tablet PC, a PDA, a laptop computer, a media player, a micro server, a global positioning system (GPS) device, and the like, but the disclosure is not limited thereto.

The home appliance 50, the display device 100, and the mobile device 150 according to an embodiment of the disclosure may transceive data via a communication network. For example, the home appliance 50 may be connected to the display device 100 or the mobile device 150, and the display device 100 and the mobile device 150 may be connected to or paired with each other.

According to an embodiment of the disclosure, the communication network may include at least one of a wired communication network or a wireless communication network. In detail, a communication network used to implement the IoT may include a mobile communication such as a wireless broadband (WiBro), world interoperability for microwave access (WiMax), Code Division Multiple Access (CDMA), Wideband Code Division Multiplex Access (WCDMA), $3^{rd}$ Generation (3G), 4th generation (4G), or 5th generation (5G), a short range communication such as Near Field Communication (NFC), Bluetooth, wireless LAN (WLAN), or Wi-Fi, and/or low-power long-range communication such as TV Whitespace (TVWS) or weightless, and the like.

The home appliance 50, the display device 100, and the mobile device 150 according to an embodiment of the disclosure may be connected through a home IoT platform. The home appliance 50, the display device 100, and the mobile device 150 may be connected to one another via the IoT cloud server 10 and an access point (AP) forming the IoT platform.

The "IoT cloud server" may refer, for example, to a server, a cloud server, or a cloud server device which are connected to a plurality of electronic devices located at a remote distance to support the IoT platform. Furthermore, the "AP" may connect a wired network and a wireless network by performing as a base station in a wireless LAN. The AP may connect a plurality of electronic devices, for example, the home appliance 50, the display device 100, the mobile device 150, and the like, to the IoT cloud server 10.

The home appliance 50 connected by the IoT platform may be controlled by the display device 100 or the mobile device 150. For example, a user may turn the home appliance 50 on or off using the display device 100 or the mobile device 150, and perform various control operations supported by the home appliance 50.

To connect the home appliance 50 to the IoT platform, a process of setting the network and account of the home appliance 50 and registering the home appliance 50 on the IoT cloud server 10 is required. A method of registering home appliance to an IoT cloud server is described below in detail with reference to the accompanying drawings.

FIGS. 2A, 2B, 2C and 2D are diagrams illustrating an example method of searching for peripheral devices by a display device, according to various embodiments.

Figure 2A:
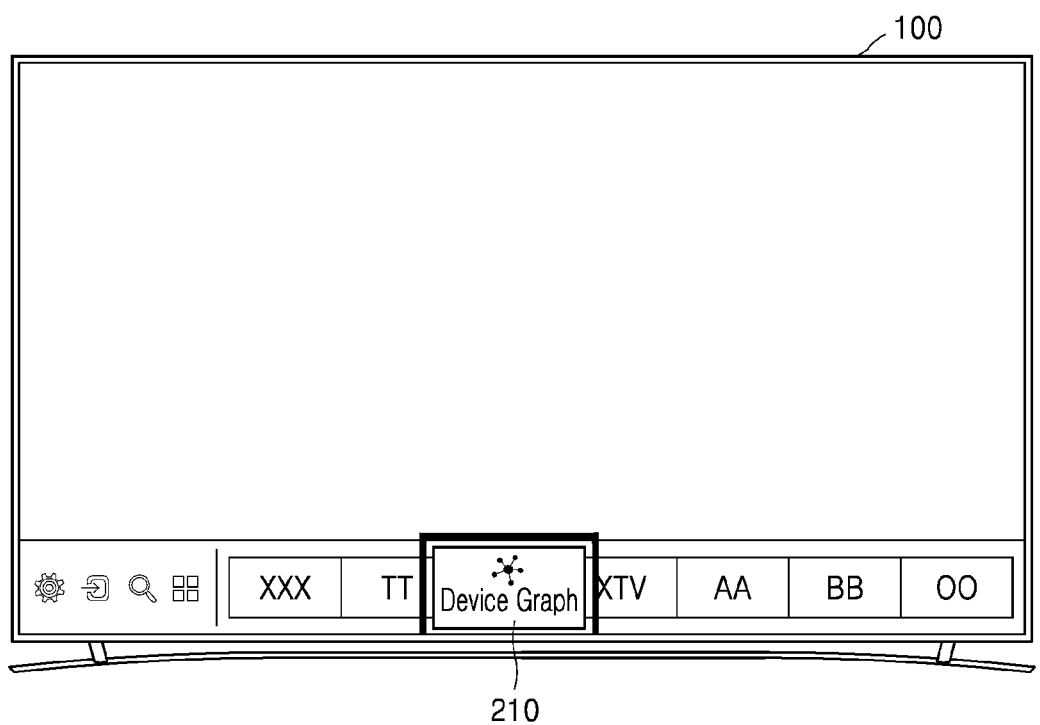
FIGS. 2A, 2B, 2C and 2D are diagrams illustrating an example method of searching for peripheral devices by a display device, according to various embodiments.

The display device 100 according to an embodiment may perform peripheral device search. As illustrated in FIG. 2A, the display device 100 may display a peripheral device search menu icon 210 and receive an input to select the peripheral device search menu icon 210. When the peripheral device search menu icon 210 is selected, the display device 100 may execute a program for peripheral device search, which is stored in the display device 100, to perform the peripheral device search.

The display device 100 according to an embodiment of the disclosure may perform the peripheral device search at a preset cycle. When a new peripheral device is found, the display device 100 may provide a pop-up message indicating that a new peripheral device is found. However, but the disclosure is not limited thereto.

The display device 100 may search for home appliances around the display device 100, for example, an air conditioner, an air purifier, a refrigerator, a robot vacuum cleaner, a washing machine, a lamp, a switch, and the like. The home appliances around the display device 100 according to an embodiment of the disclosure may include the home appliance 50 of FIG. 1. In this state, the peripheral devices connected to the same AP to which the display device 100 is connected, after network setting thereof is completed, may be found using an address resolution protocol (ARP). Furthermore, the display device 100 may search for peripheral devices using Bluetooth (BT), Bluetooth Low Energy (BLE), and the like.

Figure 2B:
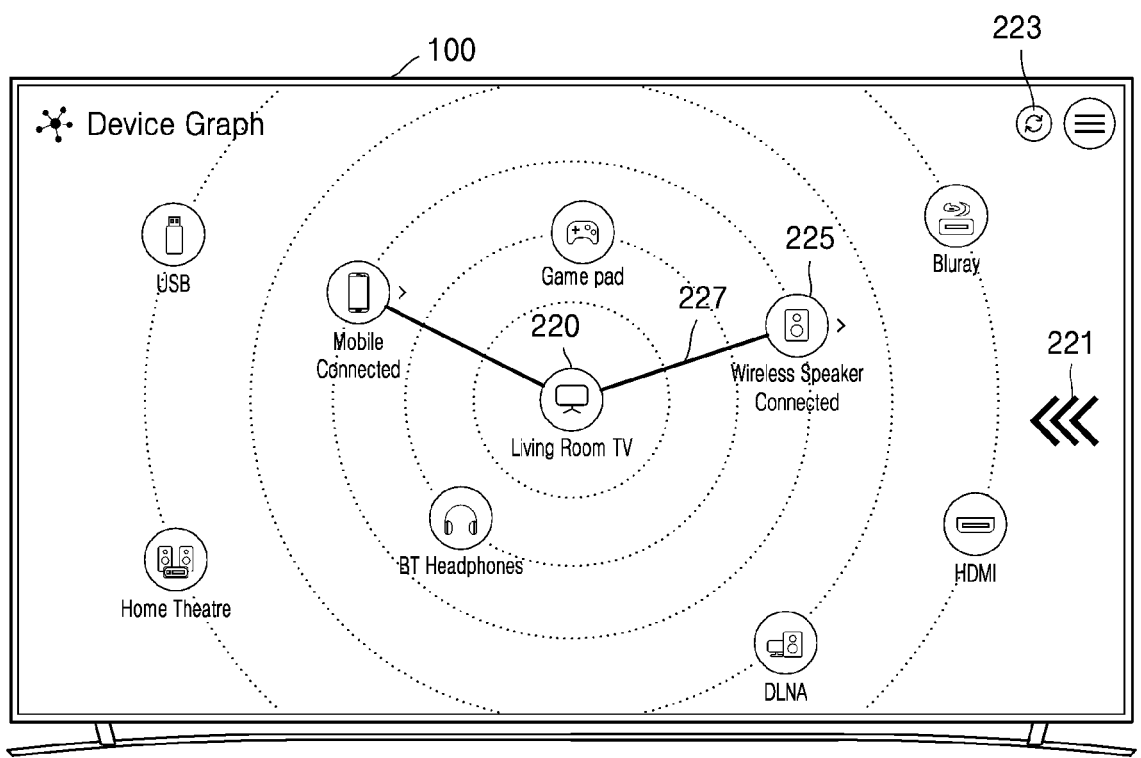

The display device 100 may display found peripheral devices, as illustrated in FIG. 2B. In this state, icons indicating the found peripheral devices may be displayed with respect to a display device icon 220, and a distance between the display device icon 220 and a peripheral device icon 225 may be determined according to the strength, or an received signal strength indicator (RSSI), of an RF signal received from a peripheral device, or the like, for example, a wireless speaker, corresponding to the peripheral device icon 225. The display device 100 may display a circle with a radius equivalent to a distance determined according to RSSI from the display device icon 220 to the peripheral device icon 225, and display the peripheral device icon 225 on the circle.

Furthermore, the display device 100 may determine a relative position or angle of peripheral devices using, for example, an arrival of angle/departure (AoA/AoD) function, and display peripheral device icons indicating peripheral devices according to the determined relative position or angle.

The display device 100 may separately display the peripheral devices that are found and connected to the same AP to which the display device 100 is connected. For example, as illustrated in FIG. 2B, the display device 100 may display an icon 221 that may display the peripheral devices that are found and connected to the same AP to which the display device 100 is connected.

Figure 2C:
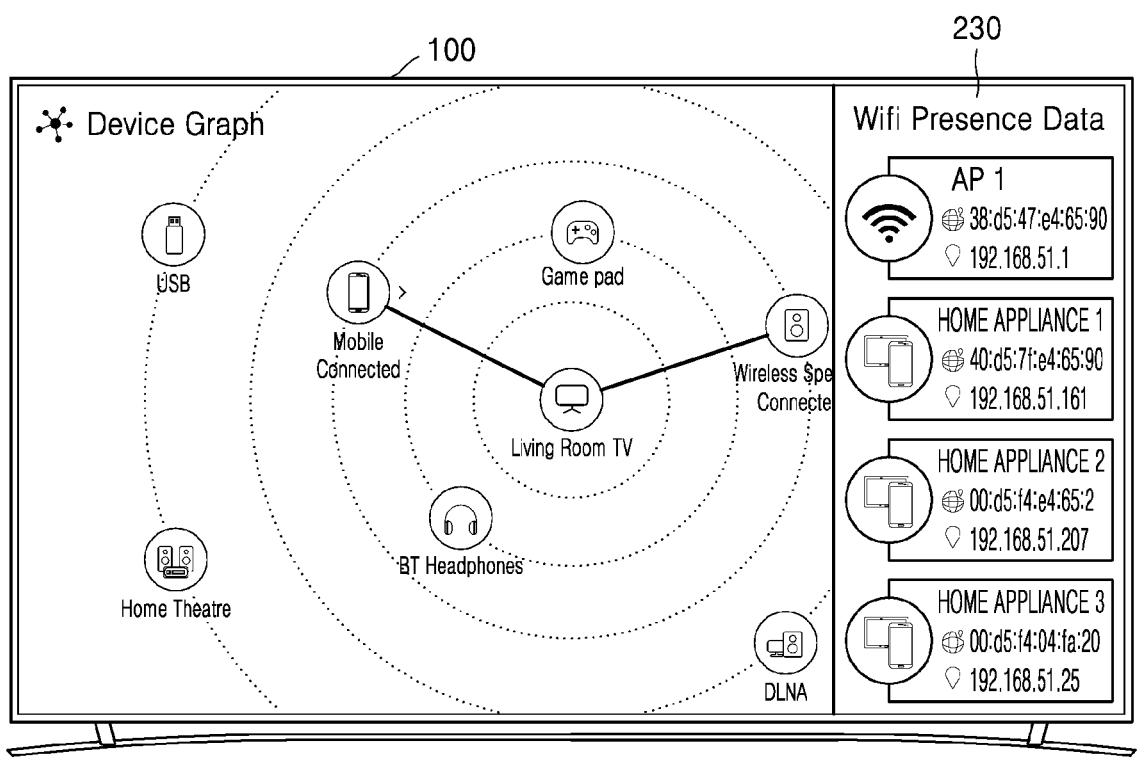

When receiving an input to select the icon 221, as illustrated in FIG. 2C, the display device 100 may display a list 230 including the peripheral devices that are found and connected to the same AP to which the display device 100 is connected.

The display device 100 according to an embodiment of the disclosure may display peripheral devices connected to the same AP and found using the ARP like the peripheral device icons illustrated in FIG. 2B. In this state, the display device 100 may separately display icons (first icons) corresponding to the peripheral devices connected to the same AP and found and icons (second icons) corresponding to the peripheral devices found using BT, BLE, and the like. For example, the display device 100 may differently display the colors of the first icons and the second icons. The display device 100 may additionally display an icon indicating Wi-Fi around the first icons, and an icon indicating BT around the second icons. However, the disclosure is not limited thereto, and the first icons and the second icons may be separately displayed in various methods.

Referring back to FIG. 2B, the display device 100 may display a connection state of the display device 100 and the peripheral devices. For example, when a peripheral device was connected to or is currently connected to the display device 100, a line 227 connecting between the display device icon 220 and the peripheral device icon 225 may be displayed. Furthermore, when the display device 100 is currently connected to the peripheral device, the line 227 is highlighted or the peripheral device icon 225 is highlighted. However, but the disclosure is not limited thereto.

Figure 2D:
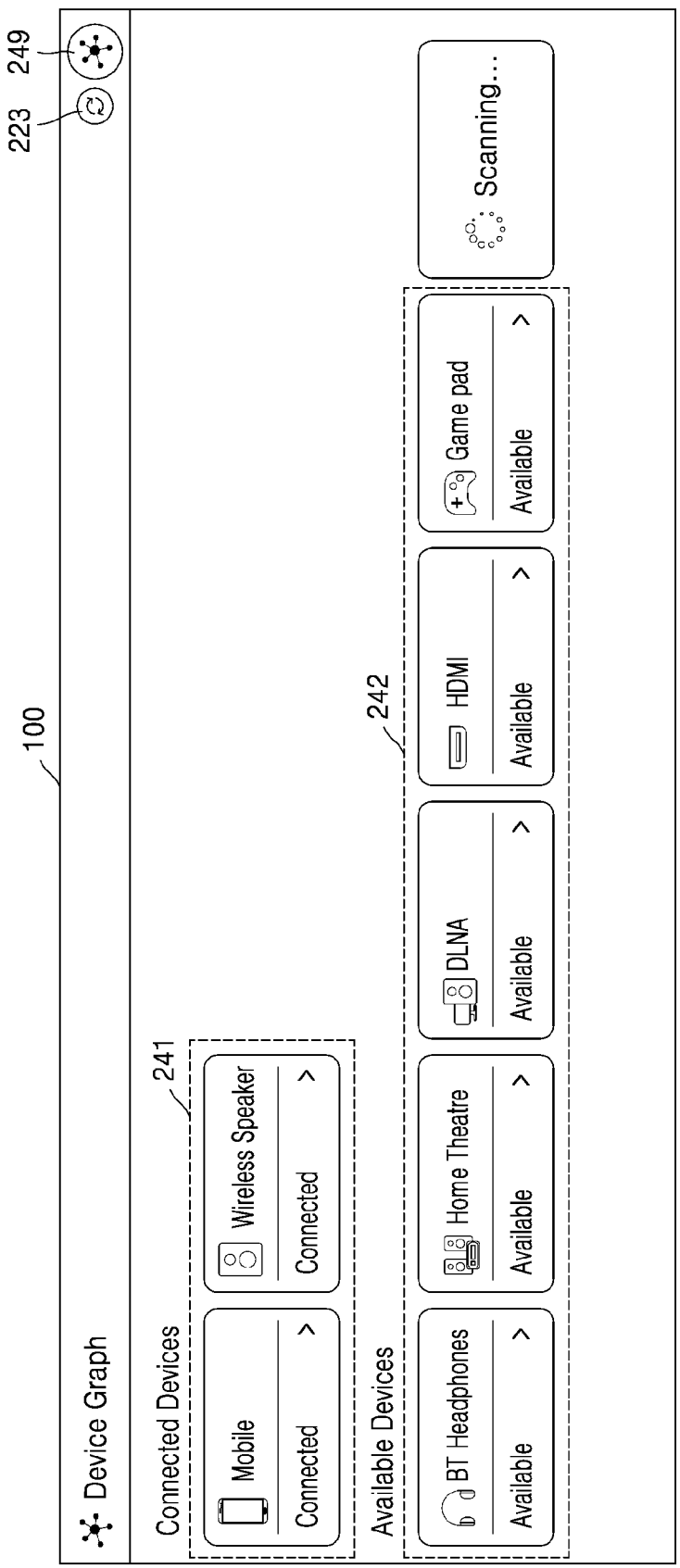

Furthermore, a user interface displaying found peripheral devices may be displayed in the form of a list, as illustrated in FIG. 2D.

Referring to FIG. 2D, the display device 100 may classify and display found peripheral devices according to a connection state. The display device 100 may classify and display currently connected peripheral devices as a connected device category 241, and peripheral devices that are found but not connected as an available device category 242.

The display device 100 may classify and display found peripheral devices according to a method of searching for peripheral devices. The display device 100 may classify and display the peripheral devices connected to the same AP to which the display device 100 is connected and found through ARP, and the peripheral device found using BT, BLE, and the like, to be different categories.

A user interface in the form of a graph illustrated in FIG. 2B may include an icon 223 capable of switching a display form, and the display device 100, when receiving an input to select the icon 223 of FIG. 2B, may switch and display the user interface in the form of a graph to the user interface in the form of a list illustrated in FIG. 2D.

Furthermore, the user interface in the form of a list of the FIG. 2D may include the icon 223 capable of switching a display form, and the display device 100, when receiving an input to select the icon 223 of FIG. 2D, may switch and display the user interface in the form of a list to the user interface in the form of a graph of FIG. 2B.

Furthermore, the user interface in the form of a graph and the user interface in the form of a list respectively illustrated in FIG. 2B and FIG. 2D may include a refresh icon 249, and when receiving an input to select the refresh icon 249, the display device 100 may redo the peripheral device search and display found peripheral devices.

FIG. 3 is a signal flow diagram illustrating an example method of registering a display device on a cloud server, according to various embodiments, and FIGS. 4A, 4B, 4C and 4D are diagrams illustrating examples of the method of FIG. 3.

Referring to FIG. 3, the display device 100 according to an embodiment of the disclosure may search for peripheral devices and display found peripheral devices (S310).

Figure 4A:
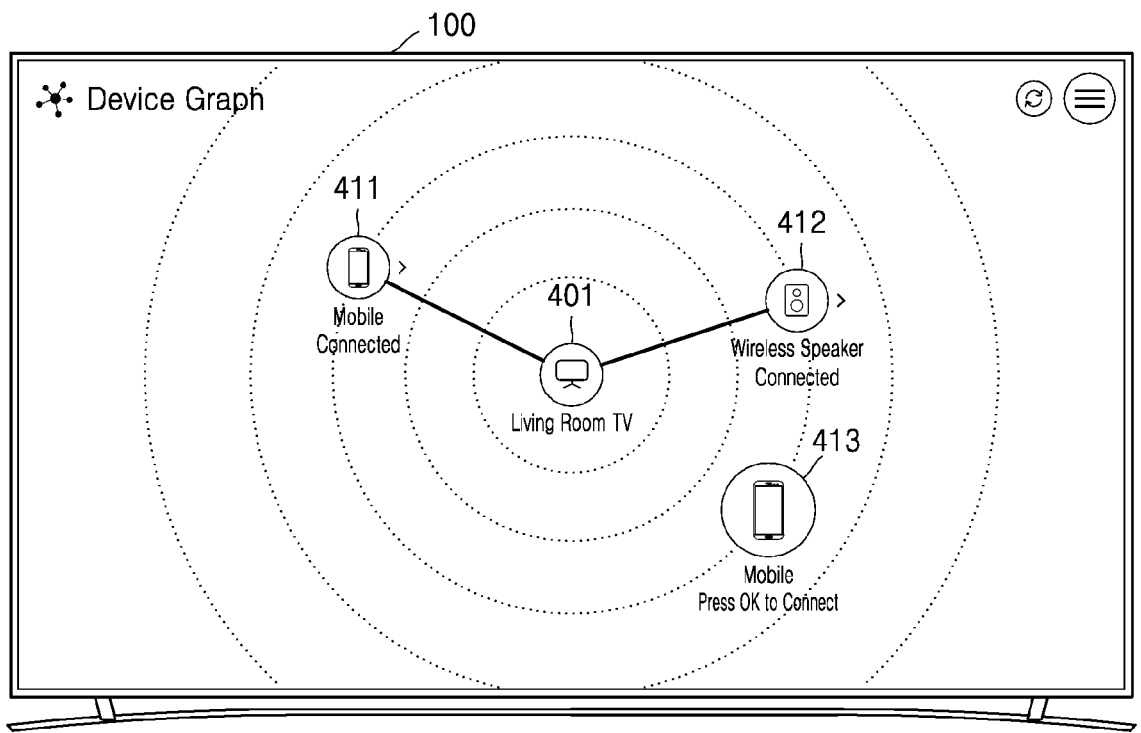
FIGS. 4A, 4B, 4C and 4D are diagrams illustrating an example of the method of FIG. 3 according to various embodiments.

For example, a first mobile device, a wireless speaker device, and a second mobile device may be found, and as illustrated in FIG. 4A, a first mobile device icon 411, a wireless speaker device icon 412, and a second mobile device icon 413 may be displayed.

The first mobile device and the wireless speaker device may be in a connection state to the display device 100, and the display device 100 may display a line connecting the first mobile device icon 411 to a display device icon 401, and display a line connecting the wireless speaker device icon 412 to the display device icon 401. Furthermore, the display device 100 and the second mobile device may not be in a connection state.

In the following description, for example, the mobile device 150 of FIG. 3 may refer, for example, to the second mobile device icon 413 that is not connected to the display device 100.

The display device 100 may receive an input to request a connection to the second mobile device 150, for example, an input to select the second mobile device icon 413 (S320).

The display device 100, when receiving an input to request a connection to the second mobile device 150, may generate and display a Quick Response (QR) code for connecting to the second mobile device 150 (S330).

Figure 4B:
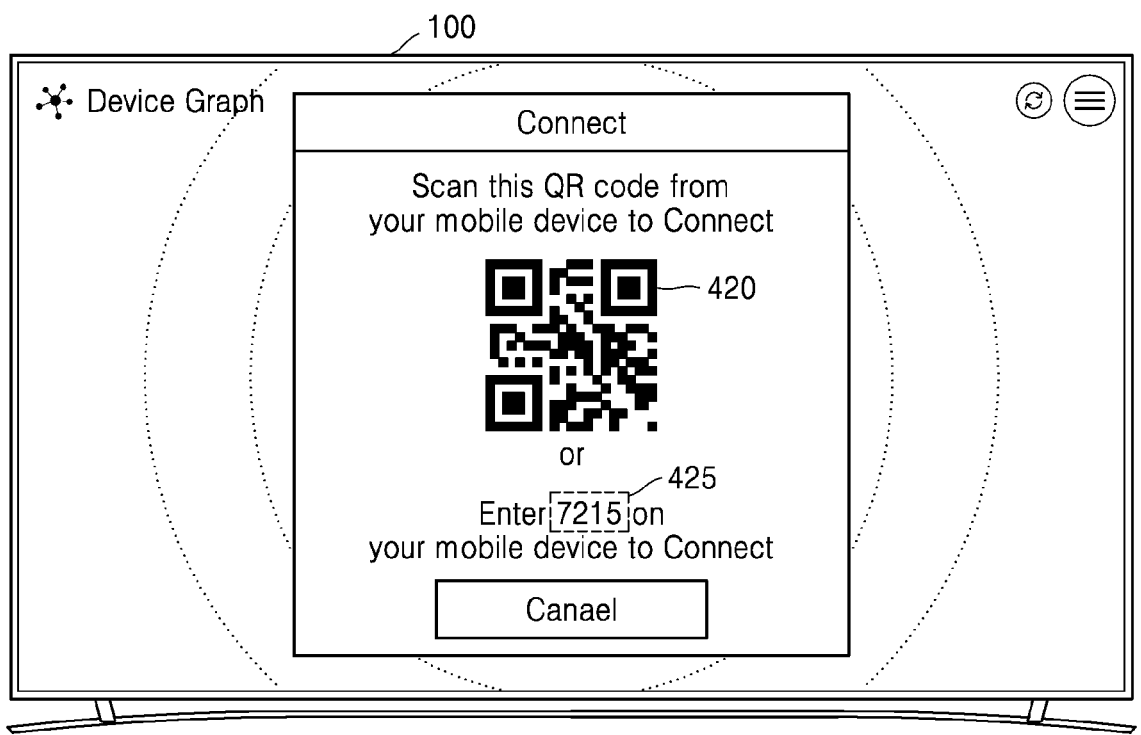

For example, the display device 100 may display on a screen a QR code generated for connecting to the second mobile device 150, as illustrated in FIG. 4B. In this state, the QR code may include a Media Access Control (MAC) address of a display device that is connection information of the display device, for example, BLE MAC information, Soft AP MAC information, and the like, and a device name of a display device. Alternatively, the QR code may include an IoT application installation URL. Furthermore, a QR code 420 may include authentication information of a display device.

Furthermore, the display device 100 may display an authentication number 425 with the QR code 420. When the second mobile device 150 is not able to scan the QR code 420, the second mobile device 150 may be connected to the display device 100 using the authentication number 425 that is displayed.

Figure 4C:
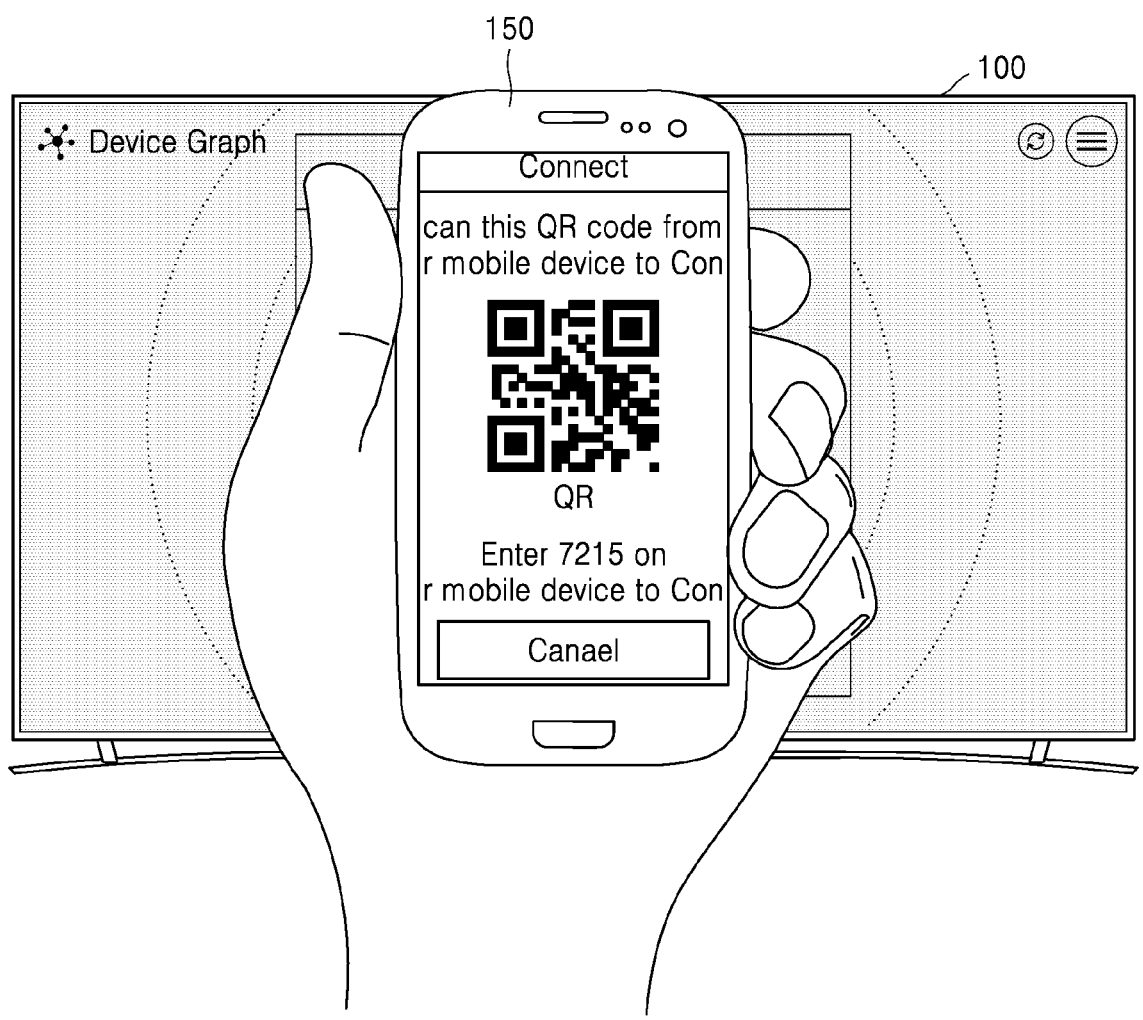

The second mobile device 150 may scan the QR code 420 displayed in the display device 100, as illustrated in FIG. 4C (S340).

The second mobile device 150 may obtain, by scanning the QR code 420, connection information and authentication information for the connection to the display device 100. The second mobile device 150 may request a connection to the display device 100 by identifying the display device 100 to be connected based on the connection information, and then use authentication information obtained from the QR code in an authentication process for the connection to the display device 100 (S350).

The display device 100 may check the authentication information received from the second mobile device 150 (S360), and complete the connection to the connection to the second mobile device 150 (S370).

When the connection between the display device 100 and the second mobile device 150 is completed, the second mobile device 150 may transmit network and account information to the display device 100 (S380).

The display device 100 may request registration to the cloud server 10 using the network and account information, and the second mobile device 150 may be registered on the cloud server 10 (S390).

Figure 4D:
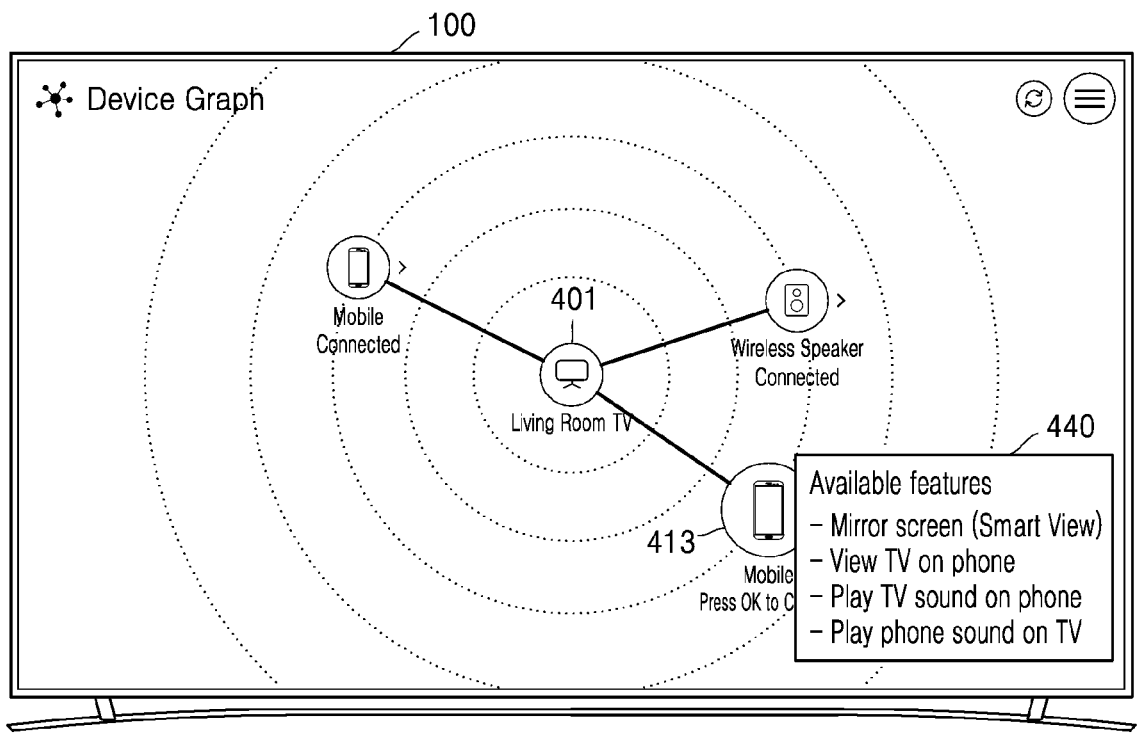

When the display device 100 and the second mobile device 150 are connected to each other, as illustrated in FIG. 4D, the display device 100 and the second mobile device 150 may be displayed to be in a connection state. For example, a line connected between the display device icon 401 and the second mobile device icon 413 may be displayed, and the line may be highlighted or the second mobile device icon 413 may be highlighted.

Furthermore, when an input to select the second mobile device 150 connected to the display device 100 is received, the display device 100 may display a service list 440 including available services in the second mobile device 150. The display device 100 may receive information about available services from the second mobile device 150 during the connection between the display device 100 and the second mobile device 150, and display the service list 440 based on the received information. For example, when the display device 100 and the second mobile device 150 are in a connection state, a content reproduced in the second mobile device 150 may be reproduced in the display device 100, and a content reproduced in the display device 100 may be reproduced in the second mobile device 150. Alternatively, sound output from the display device 100 may be output from the second mobile device 150, and sound output from the second mobile device 150 may be output from the display device 100. However, but the disclosure is not limited thereto.

Figure 5:
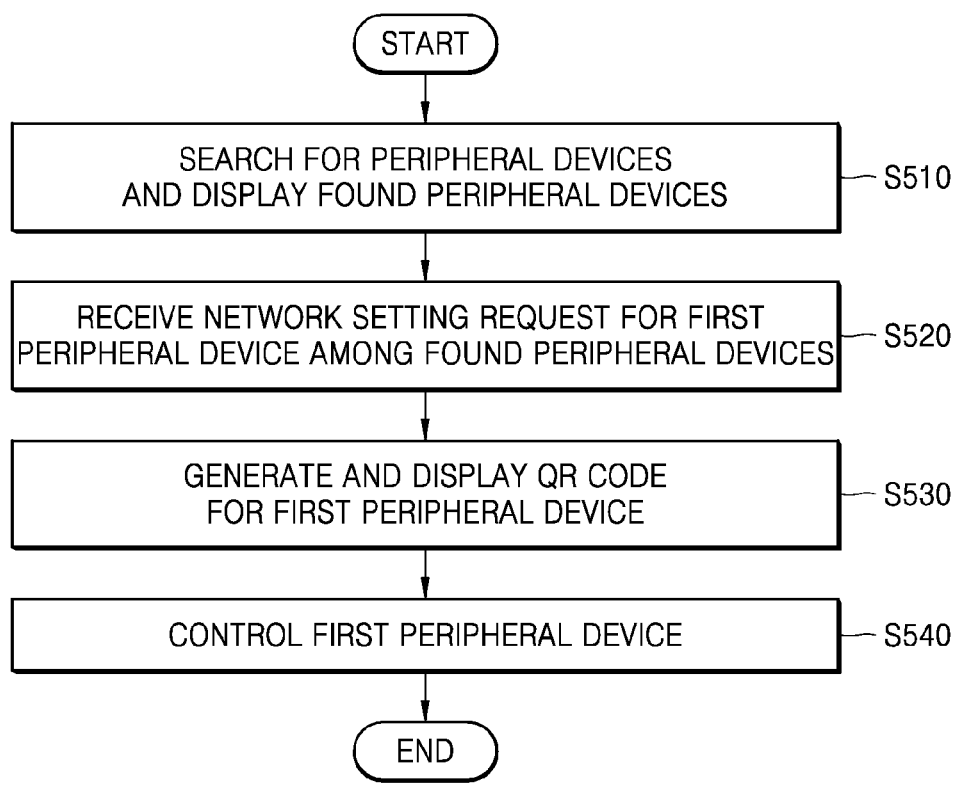
FIG. 5 is a flowchart illustrating an example method of registering, by a display device using a mobile device, a peripheral device on a cloud server, according to various embodiments.

FIG. 5 is a flowchart illustrating an example method of registering, by a display device using a mobile device, a peripheral device on a cloud server, according to various embodiments.

Referring to FIG. 5, the display device 100 according to an embodiment of the disclosure may search for peripheral devices and display found peripheral devices (S510). Operation 510 (S510) of FIG. 5 corresponds to Operation 310 (S310) of FIG. 3, and redundant descriptions are omitted.

The display device 100 according to an embodiment of the disclosure may receive a network setting request regarding a first peripheral device of the found peripheral devices (S520).

For example, the display device 100 may receive an input to select a first peripheral device icon among the displayed peripheral device icons.

The display device 100 according to an embodiment of the disclosure may generate and display a QR code for the first peripheral device (S530).

For example, the QR code may include information about a MAC address of the first peripheral device, for example, BLE MAC information, Soft AP MAC information, and the like, and a device name of the first peripheral device. Alternatively, the QR code may include an IoT application installation URL. When a first peripheral device is connected to the same AP to which the display device is connected and found through ARP, the display device 100 may obtain Soft AP MAC information of the first peripheral device, and generate a QR code including the obtained Soft AP MAC information of the first peripheral device. Furthermore, when the first peripheral device is searched for using BT, BLE, and the like, the display device 100 may obtain BLE MAC information of the first peripheral device, and generate a QR code including the obtained BLE MAC information of the first peripheral device.

The mobile device 150 according to an embodiment of the disclosure may scan the QR code displayed in the display device 100. The mobile device 150 may obtain connection information about the first peripheral device by scanning the QR code, and perform a connection request by identifying the first peripheral device to perform connection based on the connection information. The connection operation of the mobile device 150 and the first peripheral device is described in greater detail below with reference to FIG. 6.

When the first peripheral device is connected to the mobile device, the mobile device 150 may transmit network and account information to the first peripheral device. The first peripheral device may be registered on the cloud server 10 using the network and account information received from the mobile device 150.

When the first peripheral device is registered on the cloud server 10, the first peripheral device may transmit to the display device 100 information indicating that the registration on the cloud server 10 is completed and information about available services during the connection between the first peripheral device and the display device 100, for example, a function of the first peripheral device that is controllable by the display device 100, and the like.

The display device 100 may display a service list corresponding to the first peripheral device, based on the information about available services during the connection between the first peripheral device and the display device, received from the first peripheral device.

When the first peripheral device is registered on the cloud server, the display device 100 may control the first peripheral device via the cloud server 10 (S540).

In this state, the first peripheral device may be registered on the cloud server 10 with the same account as the display device 100, and the display device 100 may transmit a control command of the first peripheral device to the cloud server 10, and the cloud server 10 may control the first peripheral device based on the control command received from the display device 100. For example, the cloud server 10 may control the first peripheral device based on an input to select any one of a plurality of services included in the service list displayed on the display device 100. However, but the disclosure is not limited thereto.

FIG. 6 is a signal flow diagram illustrating an example method of registering a peripheral device on a cloud server by a display device, according to various embodiments, and FIGS. 7A, 7B, 7C and 7D are diagrams illustrating examples of the method of FIG. 6.

Referring to FIG. 6, a peripheral device 50 according to an embodiment of the disclosure may transmit information indicating a state in which a network setting is necessary, as a BLE Advertising packet. The peripheral device 50 may operate a Soft AP or BLE advertisement in an on state (S610).

According to an embodiment of the disclosure, a display device 100 may search for peripheral devices using Wi-Fi communication and BT or BLE communication (S615), and display found peripheral devices (S620).

Figure 7A:
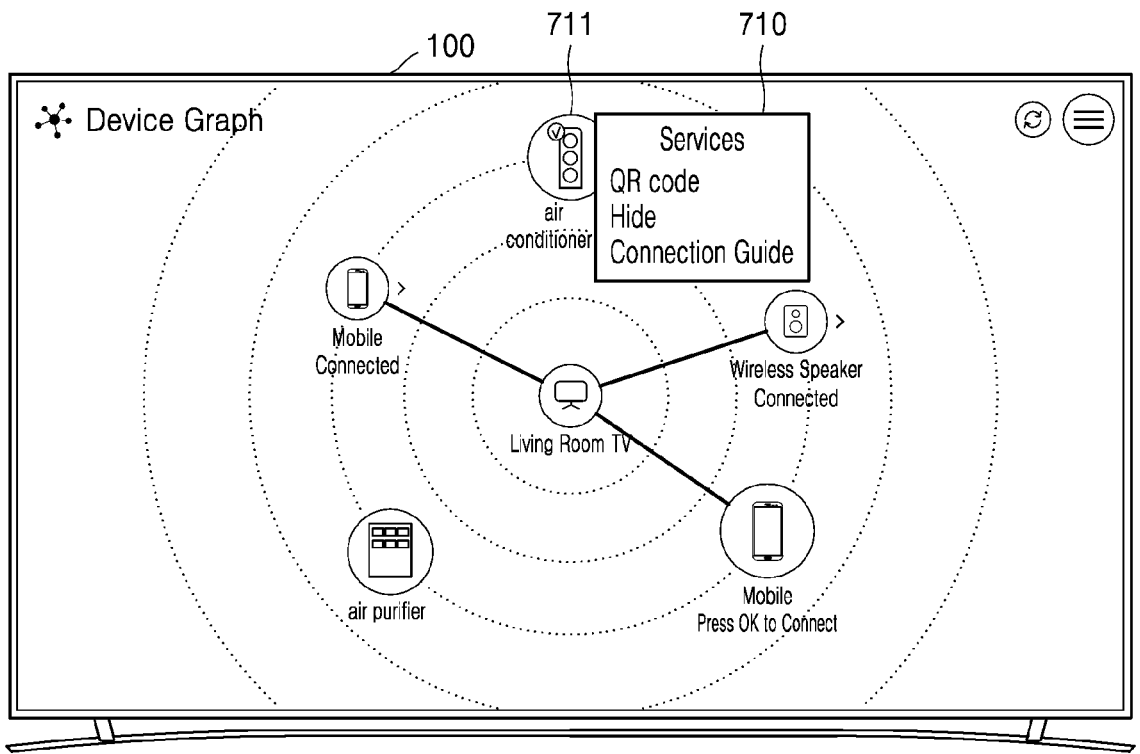
FIGS. 7A, 7B, 7C and 7D are diagrams illustrating an example of the method of FIG. 6 according to various embodiments.

For example, as illustrated in FIG. 7A, a mobile device, a wireless speaker device, an air purifier, an air conditioner, and the like may be searched for, and icons respectively corresponding to the found peripheral devices may be displayed on a screen.

The mobile device and the wireless speaker device may be in a state of being connected to the display device 100. The air conditioner may be in a state of not being connected to the display device 100, and in which no network and account setting is done. Furthermore, the mobile device may be a device having network and account information to register a peripheral device on a cloud server.

In the following description, an example in which the peripheral device 50 of FIG. 6 is an air conditioner is described by way of non-limiting example.

The display device 100 may receive an input to request network and account settings of an air conditioner (S625).

For example, as illustrated in FIG. 7A, when an air conditioner icon 711 is selected, as the air conditioner is in a state of not being connected to the display device 100, the display device 100 may display a first service list 710. In this state, the air conditioner is in a state in which no network and account setting is done, and the first service list 710 may include a QR code menu. The display device 100 may receive an input to select the QR code menu.

Figure 7B:
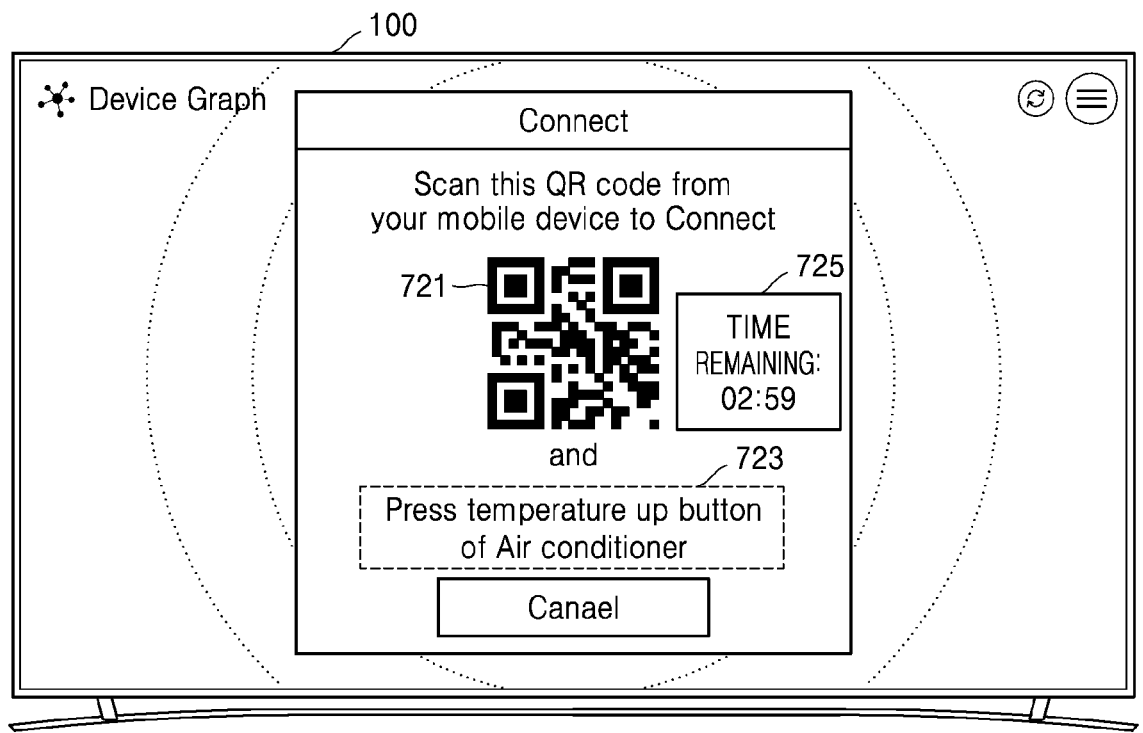

The display device 100, when receiving an input to select network setting and account setting of air conditioner, for example, an input to select the QR code menu, may generate and display a QR code for connecting to the air conditioner (S630). For example, the display device 100, as illustrated in FIG. 7B, may display on a screen a QR code 721 generated for connecting to the air conditioner. In this state, the QR code 721 may include connection information of the air conditioner. The connection information of the air conditioner may include a MAC address and a device name of the air conditioner. For example, for a peripheral device for transmitting a BLE advertising packet, a QR code may be generated using BLE MAC information, and for a peripheral device with an activated Soft AP, a QR code may be generated by a Soft AP MAC. The display device 100, when searching for peripheral devices, may obtain connection information about peripheral devices, but the disclosure is not limited thereto.

Furthermore, the display device 100 may display an authentication guide 723 for connecting to the air conditioner (S640).

For a peripheral device according to an embodiment of the disclosure, as the display device 100 is not able to identify unique authentication information of the peripheral device, a process of performing authentication through a specific operation, for example, a user presses a specific button of the peripheral device is necessary. Accordingly, the display device 100 may display an authentication guide for performing authentication, together with the QR code.

The display device 100 according to an embodiment of the disclosure may receive authentication guide generation information from the air conditioner, and generate and display the authentication guide 723 based on the authentication guide generation information.

For example, referring to FIG. 7B, the authentication guide 723 regarding the air conditioner may include a message to press a specific button of the air conditioner, for example, a temperature control button, after QR code scanning.

The display device 100 according to an embodiment of the disclosure may store the authentication guide, as a database, for each manufacturer or type of the peripheral device, and display an authentication guide corresponding to a selected peripheral device. Furthermore, when a new peripheral device is added, the display device 100 may additionally store an authentication guide regarding the new peripheral device, and update the data base.

Furthermore, the display device 100 may display information 725 about an authentication valid time (time out) with the authentication guide 723. The authentication valid time (timeout) may be counted from a time point when the display device 100 receives a QR code generation request and a QR code is displayed, but the disclosure is not limited thereto. Furthermore, when counting the authentication valid time starts, the display device 100 may transmit to the air conditioner a signal or information indicating that authentication has begun.

The mobile device 150 may scan the QR code (S645), and transmit a request connection to the air conditioner, to the air conditioner, based on the air conditioner connection information obtained from the QR code (S650).

A user may perform authentication according to the authentication guide displayed on the display device 100. For example, a user may press a specific button of an air conditioner, and the air conditioner may receive an input to press the specific button (S655), and complete a connection to the mobile device 150 (S660). The air conditioner may receive, from the display device 100, a signal or information indicating that authentication has begun. Accordingly, the authentication may be determined to be a valid authentication only when a signal according to the authentication guide, for example, a signal corresponding to the input to press the specific button of the air conditioner, is received before the authentication valid time is terminated.

When the connection between the air conditioner and the mobile device 150 is completed, the mobile device 150 may transmit network and account information to the air conditioner (S670).

The air conditioner may request registration on the cloud server 10 using the network and account information, and may be registered on the cloud server 10 (S675).

When the air conditioner is registered on the cloud server 10, the air conditioner may transmit, to the display device 100, information indicating that registration on the cloud server 10 has been completed and information regarding available services, for example, functions of the air conditioner to be controlled by the display device 100, and the like, during the connection between the air conditioner and the display device 100.

Figure 7C:
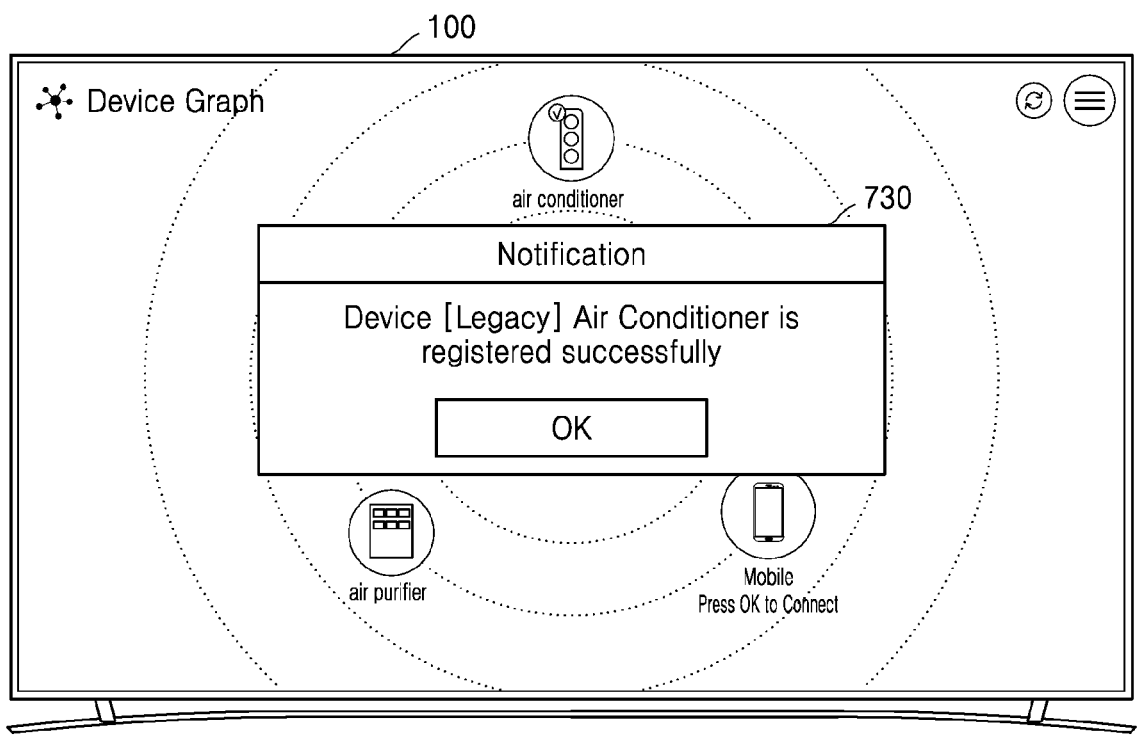

The display device 100 may display a registration completion message 730, as illustrated in FIG. 7C.

Figure 7D:
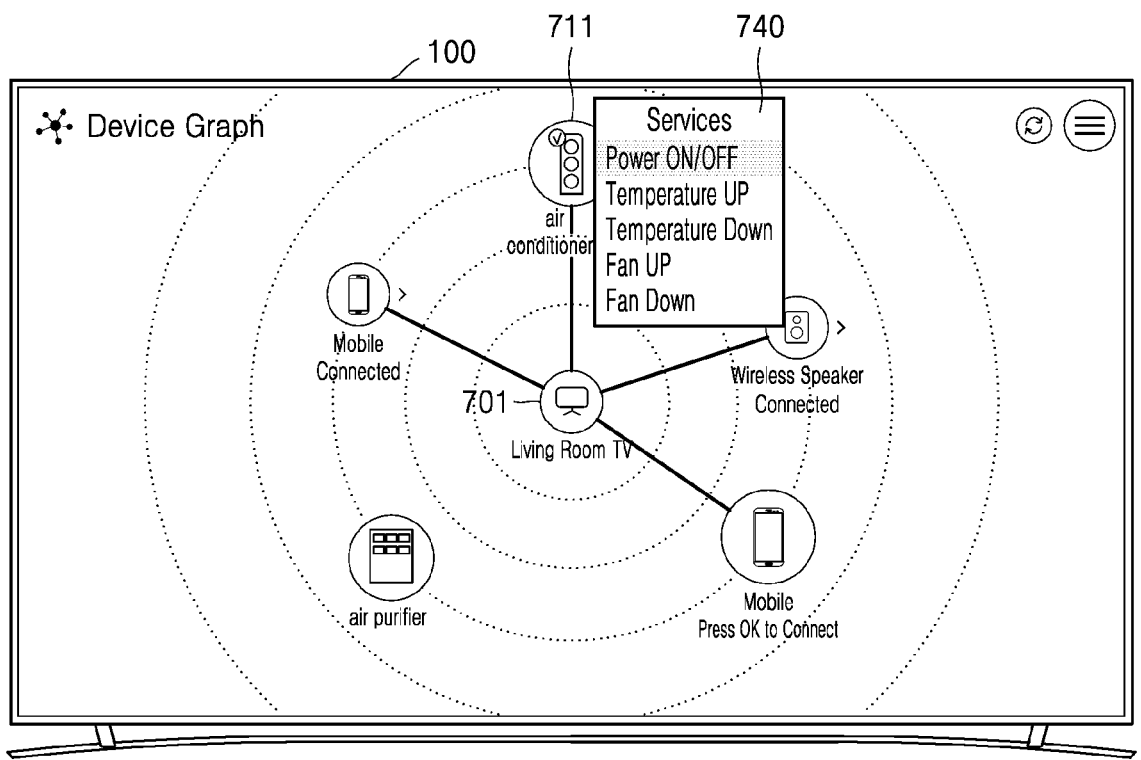

The air conditioner may be registered on the cloud server 10 with the same account as the display device 100. When the display device 100 and the air conditioner are registered on the cloud server 10 based on the same account, the display device 100 and the air conditioner may be displayed to be in a connection state. For example, as illustrated in FIG. 7D, a line connecting between a display device icon 701 and the air conditioner icon 711 may be displayed, and the line may be highlighted or the air conditioner icon 711 may be highlighted.

The display device 100 according to an embodiment of the disclosure may control the peripheral device (for example, home appliance) 50 registered through the cloud server 10. The display device 100, when receiving an input to select the peripheral device 50 registered on the cloud server 10, may display a second service list 740 including available services. The second service list 740 may be generated based on the information about available services during the connection between the air conditioner and the display device 100, the information being received from the air conditioner. For example, the second service list 740 may include a power on/off menu, a temperature control menu, a wind power control menu, and the like.

The display device 100 according to an embodiment of the disclosure, when receiving an input to select a menu, may transmit a control command corresponding to the selected menu to the cloud server 10, and the cloud server 10 may control the air conditioner by transmitting the control command received from the display device 100 to the air conditioner. For example, the power on/off, the temperature control, the wind power control, and the like of the air conditioner may be performed.

According to an embodiment of the disclosure, when a peripheral device is registered on a cloud server, a user may easily control the peripheral device through an input to select a menu included in a service list displayed on a display device.

Furthermore, the mobile device 150 may control the peripheral device 50 registered on the cloud server 10 through the cloud server 10 (S680 and S690).

Figure 8:
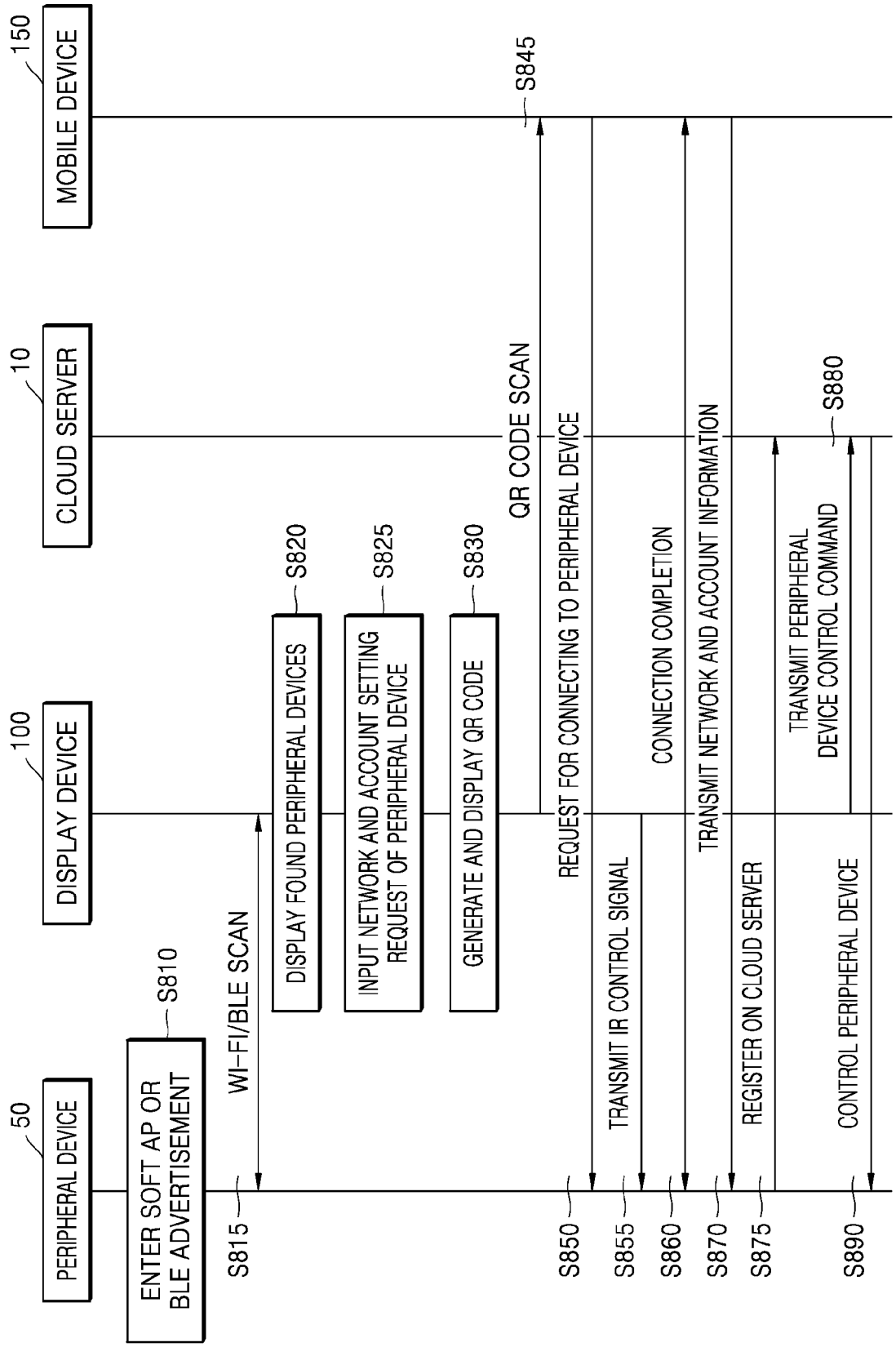
FIG. 8 is a signal flow diagram illustrating an example method of registering, by a display device using a mobile device, a peripheral device on a cloud server, according to various embodiments.

FIG. 8 is a signal flow diagram illustrating an example method of registering, by a display device using a mobile device, a peripheral device on a cloud server, according to various embodiments.

Referring to FIG. 8, as operations S810, S815, S820, S825 and S830 of FIG. 8 respectively correspond to the operations S610, S615, S620, S625 and S630 of FIG. 6, detailed descriptions thereof may not be repeated here. Furthermore, as operations S845 and S850 of FIG. 8 respectively correspond to the operations S645 and S650 of FIG. 6, detailed descriptions thereof may not be repeated here.

The display device 100 and the peripheral device 50 according to an embodiment of the disclosure may be device supporting an infrared (IR) communication method, and may include an IR communication module. The display device 100 may store IR control code information, as a data base, for each manufacturer or type of the peripheral device Furthermore, the display device 100 may store authentication information for each manufacturer or type of the peripheral device.

When the display device 100 and the peripheral device 50 according to an embodiment of the disclosure are devices supporting the IR communication method, the display device 100 may not display the authentication guide for authentication of a peripheral device, and may generate an IR signal corresponding to the authentication guide information received from the peripheral device and transmit the generated IR signal to the peripheral device, thereby performing authentication (S855).

For example, the display device 100 may obtain the peripheral device 50 information, determine IR control code information corresponding to the peripheral device based on the peripheral device information, and when the authentication guide information received from the peripheral device 50 is "Press a temperature control button," may generate an IR control signal corresponding to a case when the temperature control button is pressed, based on the IR control code information corresponding to the peripheral device, and may transmit the generated IR control signal to the peripheral device 50. The display device 100 may transmit the generated IR control signal to the peripheral device 50 through a control device of the display device 100 that is wirelessly connected using BT and the like. Alternatively, the display device 100 may transmit the IR control code information and the authentication guide information to the control device of the display device 100 that is wirelessly connected using BT and the like, and the control device may transmit the generated IR control signal to the peripheral device 50 based on the received authentication guide information and IR control code information.

The display device 100 may transmit the IR control signal to authenticate the peripheral device 50, to the peripheral device 50, using the authentication information and the IR control code information corresponding to the peripheral device 50. For example, the IR control signal may be a control signal corresponding to a specific operation such as pressing a specific button of a peripheral device and the like, but the disclosure is not limited thereto.

The peripheral device 50, when receiving the IR control signal, may complete the connection to the mobile device 150 (S860).

When the connection between the peripheral device 50 and the mobile device 150 is completed, the mobile device 150 may transmit network and account information to the peripheral device 50 (S870).

The peripheral device may request registration on the cloud server 10 using the network and account information, and may be registered on the cloud server 10 (S875).

The display device 100 according to an embodiment of the disclosure may transmit a control command of the peripheral device to the cloud server 10 (S880), and the cloud server 10 may control the peripheral device 50 by transmitting the control command received from the display device 100 to the peripheral device 50 (S890).

Operations S860, S870, S875, S880 and S890 of FIG. 8 respectively correspond to the operations S660, S670, S675, S680 and S690 of FIG. 6.

Figure 9:
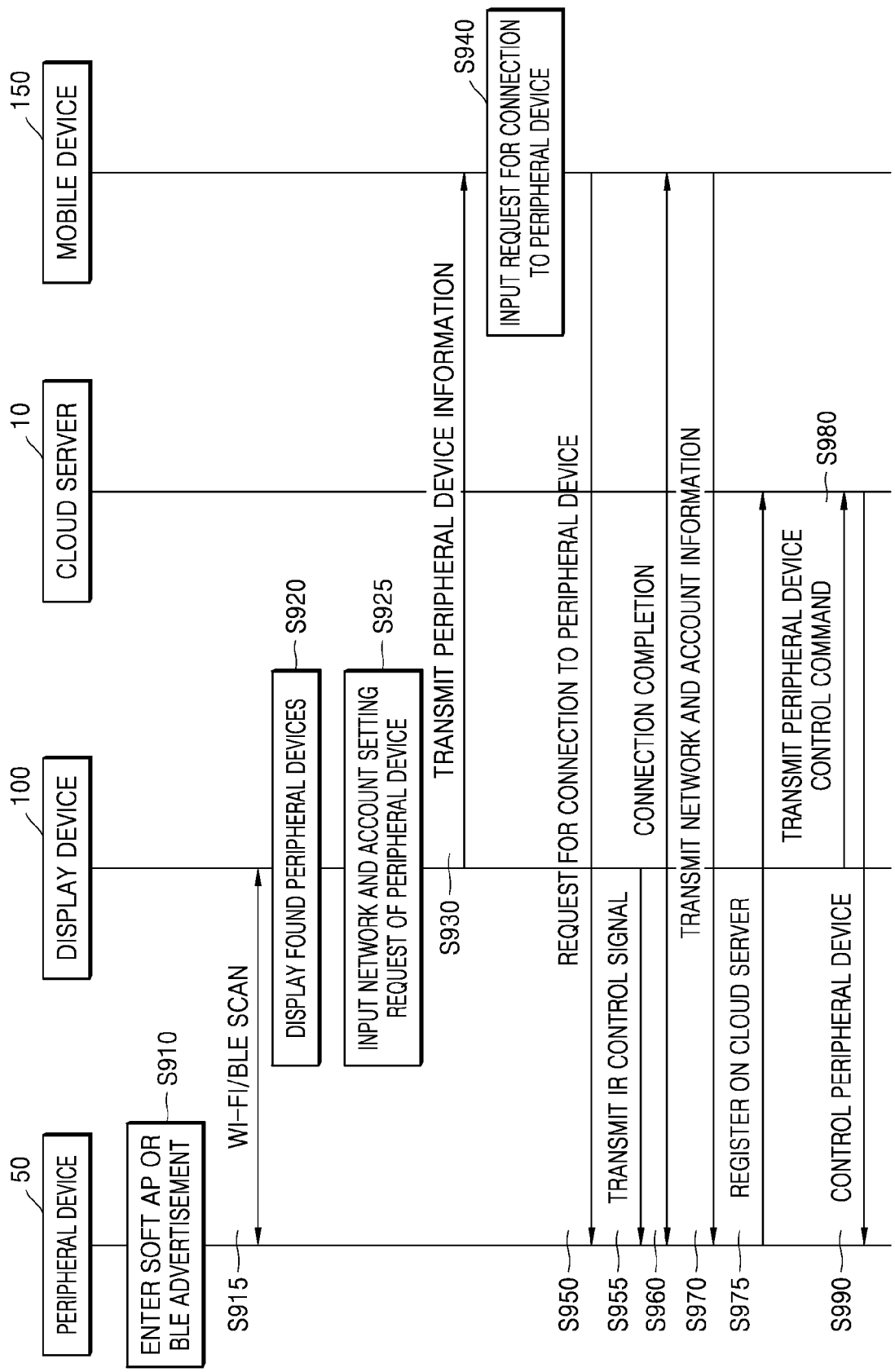
FIG. 9 is a signal flow diagram illustrating an example method of registering, by a display device using a mobile device, a peripheral device on a cloud server, according to various embodiments.

FIG. 9 is a signal flow diagram illustrating an example method of registering, by a display device using a mobile device, a peripheral device on a cloud server, according to various embodiments.

Referring to FIG. 9, as operations S910, S915, S920 and S925 of FIG. 9 respectively correspond to the operations S610, S615, S620 and S625 of FIG. 6, detailed descriptions thereof may not be repeated here.

The display device 100 according to an embodiment of the disclosure may transmit the peripheral device information selected in the operation S925 to the mobile device 150 (S930). In this state, the peripheral device information may include information about a MAC address of the peripheral device, a device name of the peripheral device, a connection method type of the peripheral device such as Soft AP, BLE, and the like, and the like.

The mobile device 150, when receiving the peripheral device information receiving from the display device 100, may display a message asking whether to perform network and account settings of the peripheral device. However, but the disclosure is not limited thereto.

When a request for connection to the peripheral device is input (S940), the mobile device 150 may transmit a connection request to the peripheral device 50 based on the peripheral device information (S950).

The display device 100 may perform authentication by transmitting an IR control signal to the peripheral device 50 (S955). As the operation S955 corresponds to the operation S855 of FIG. 8, detailed descriptions thereof may not be repeated here.

When the peripheral device 50 receives the IR control signal, the connection to the mobile device 150 may be completed (S960).

When the connection between the peripheral device 50 and the mobile device 150 is completed, the mobile device 150 may transmit the network and account information to the peripheral device 50 (S970).

The peripheral device 50 may request registration on the cloud server 10 using the network and account information, and may be registered on the cloud server 10 (S975).

The display device 100 according to an embodiment of the disclosure may transmit a control command of the peripheral device 50 to the cloud server 10 (S980), and the cloud server 10 may transmit the control command received from the display device 100 to the peripheral device 50, thereby controlling the peripheral device 50 (S990). Operations S960, S970, S975, S980 and S990 of FIG. 9 respectively correspond to the operations S660, S670, S675, S680 and S690 of FIG. 6.

Figure 10:
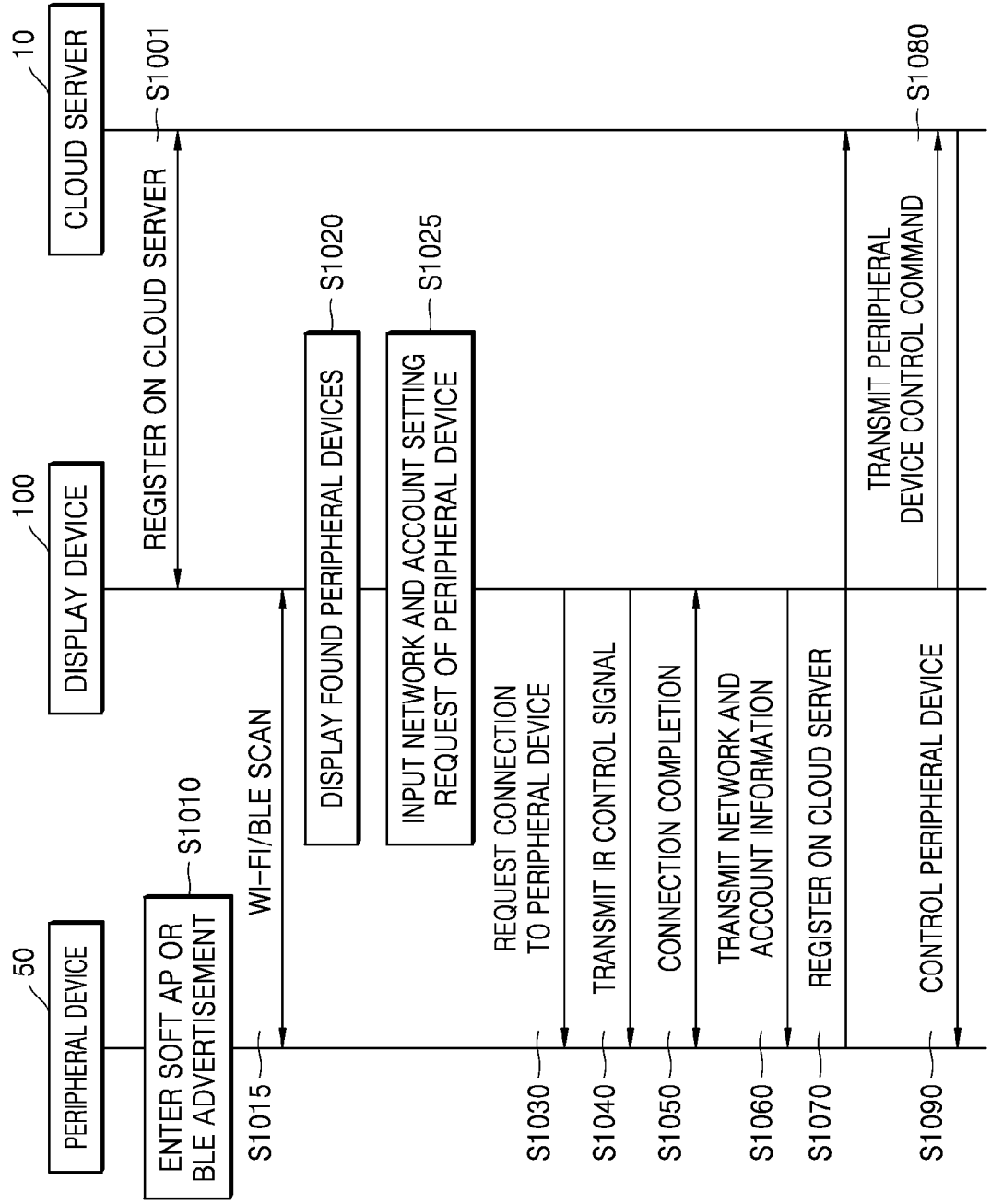
FIG. 10 is a signal flow diagram illustrating an example method of registering a peripheral device on a cloud server by a display device, according to various embodiments.

FIG. 10 is a signal flow diagram illustrating an example method of registering a peripheral device on a cloud server by a display device, according to various embodiments.

Referring to FIG. 10, as operations S1010, S1015, S1020 and S1025 of FIG. 10 respectively correspond to the operations S610, S615, S620 and S625 of FIG. 6, detailed descriptions thereof may not be repeated here.

The display device 100, when receiving an input to request network and account settings of the peripheral device, may request a connection to the peripheral device 50 based on the connection information of the peripheral device 50 (S1030). The connection information about peripheral devices may include a MAC address of the peripheral device or a device name of the peripheral device. For example, for a peripheral device for transmitting a BLE advertising packet, the connection information may include BLE MAC information, and for a peripheral device with an activated Soft AP, the connection information may include Soft AP MAC information. The display device 100, when searching for peripheral devices in operation S1015, may obtain connection information about peripheral devices, but the disclosure is not limited thereto.

The display device 100 may perform authentication by transmitting an IR control signal to the peripheral device 50 (S1040). As operation S1040 of FIG. 10 corresponds to the operation S855 of FIG. 8, a detailed description thereof may not be repeated here.

The peripheral device 50, when receiving the IR control signal, may complete the connection to the display device 100 (S1050).

When the connection between the peripheral device 50 and the display device 100 is completed, the display device 100 may transmit the network and account information to the peripheral device 50 (S1060).

The peripheral device 50 may request registration on the cloud server 10 using the network and account information, and may be registered on the cloud server 10 (S1070).

The display device 100 according to an embodiment of the disclosure may transmit a control command of the peripheral device 50 to the cloud server 10 (S1080), and the cloud server 10 may transmit the control command received from the display device 100 to the peripheral device 50, thereby controlling the peripheral device 50 (S1090).

Figure 11:
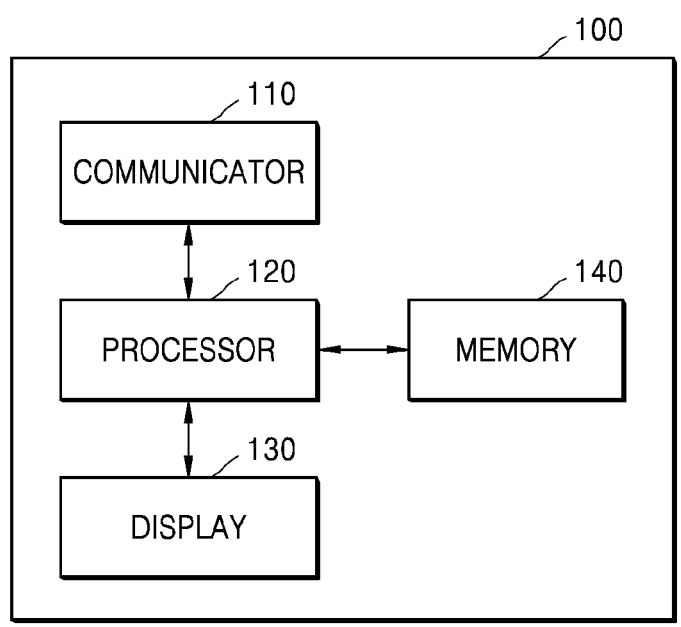
FIG. 11 is a block diagram illustrating an example configuration of a display device according to various embodiments.

FIG. 11 is a block diagram illustrating an example configuration of a display device according to various embodiments.

Referring to FIG. 11, the display device 100 according to an embodiment of the disclosure may include a communicator (e.g., including communication circuitry) 110, a processor (e.g., including processing circuitry) 120, a display 130, and a memory 140.

The communicator 110 according to an embodiment of the disclosure may include various communication circuitry and transceive data or signals with an external device or an external server under the control of the processor 120. The communicator 110 according to an embodiment of the disclosure may communicate with the IoT cloud server through at least one wireless network. For example, the communicator 110 may be connected to an AP to communicate with the IoT cloud server via at least one wireless network.

The communicator 110 may transceive data or signals by at least one of methods such as a wireless LAN, for example, Wi-Fi, Bluetooth, wired Ethernet, IR, BLE, ultrasound, and Zigbee. The communicator 110 may include at least one of communication modules capable of transceiving data according to a communication protocol corresponding to the above-described wireless LAN, for example, Wi-Fi, Bluetooth, wired Ethernet, IR, BLE, ultrasound, and Zigbee.

Furthermore, a wireless LAN communication module may include a Wi-Fi communication module, and the like, which performs a wireless communication according to the Wi-Fi communication protocol. The Wi-Fi communication module may include a Wi-Fi chipset that is a Wi-Fi module capable of transmitting data in packets according to the Wi-Fi communication protocol.

Furthermore, the communicator 110 may include a short-range communication module, for example, an IR communication module, and the like, which is capable of receiving a control command from a remote control device. In this case, the communicator 110 may receive the control command from the remote control device. Alternatively, the communicator 110 may receive a control command based on the IoT platform through the wireless LAN communication module.

The communicator 110 according to an embodiment of the disclosure may search for peripheral devices using a Wi-Fi communication and a BT or BLE communication.

Furthermore, the communicator 110 may transmit an IR control signal to authenticate a peripheral device, to the peripheral device.

Furthermore, when the peripheral device is registered on a cloud server, the communicator 110 may transmit a control command to control the peripheral device, to the cloud server.

The processor 120 according to an embodiment of the disclosure may include various processing circuitry and may generally control the operation of the display device 100. Furthermore, the processor 120 may control other elements included in the display device 100 such that a certain operation is performed.

The processor 120 according to an embodiment of the disclosure may execute one or more programs stored in the memory 140. The processor 120 may include a single core, a dual core, a triple core, a quad core, and a multiple core thereof. Furthermore, the processor 120 may include a plurality of processors.

The memory 140 according to an embodiment of the disclosure may store various pieces of data, programs, or applications to drive and control the display device 100.

Furthermore, a program stored in the memory 140 may include one or more instructions. The programs, or one or more instructions, or applications stored in the memory 140 may be performed by the processor 120.

The processor 120 according to an embodiment of the disclosure may control the communicator 110 to search for a peripheral device, and control the display 130 to display a found peripheral device. Furthermore, when an input to request network and account settings of the found peripheral device, a QR code for connecting to the peripheral device may be generated and displayed on the display 130. The QR code may include connection information of the peripheral device, and include a MAC address of the peripheral device or a device name of the peripheral device. Furthermore, the processor 120 may provide an authentication guide for performing authentication of a peripheral device, and transmit an IR control signal to the peripheral device. When the processor 120 registers the peripheral device on the cloud server, the processor 120 may control the communicator 110 to transmit a control command to control the peripheral device to the cloud server.

According to an embodiment of the disclosure, the display 130 may generate a driving signal by converting an image signal, a data signal, an OSD signal, a control signal, and the like, which are processed by the processor 120. The display 130 may be implemented by a PDP, a LCD, an OLED, a flexible display, and the like, and furthermore, by a 3D display. Furthermore, the display 130 may be configured by a touch screen to be used as an input device other than an output device.

The display 130 according to an embodiment of the disclosure may display a found peripheral device, and display the found peripheral device in the form of a graph or a list. Furthermore, a QR code including the connection information of a peripheral device may be displayed, and an authentication guide for connecting to a peripheral device may be displayed. Furthermore, the display 130 may display an available service list in the peripheral device having completed the network and account settings.

Figure 12:
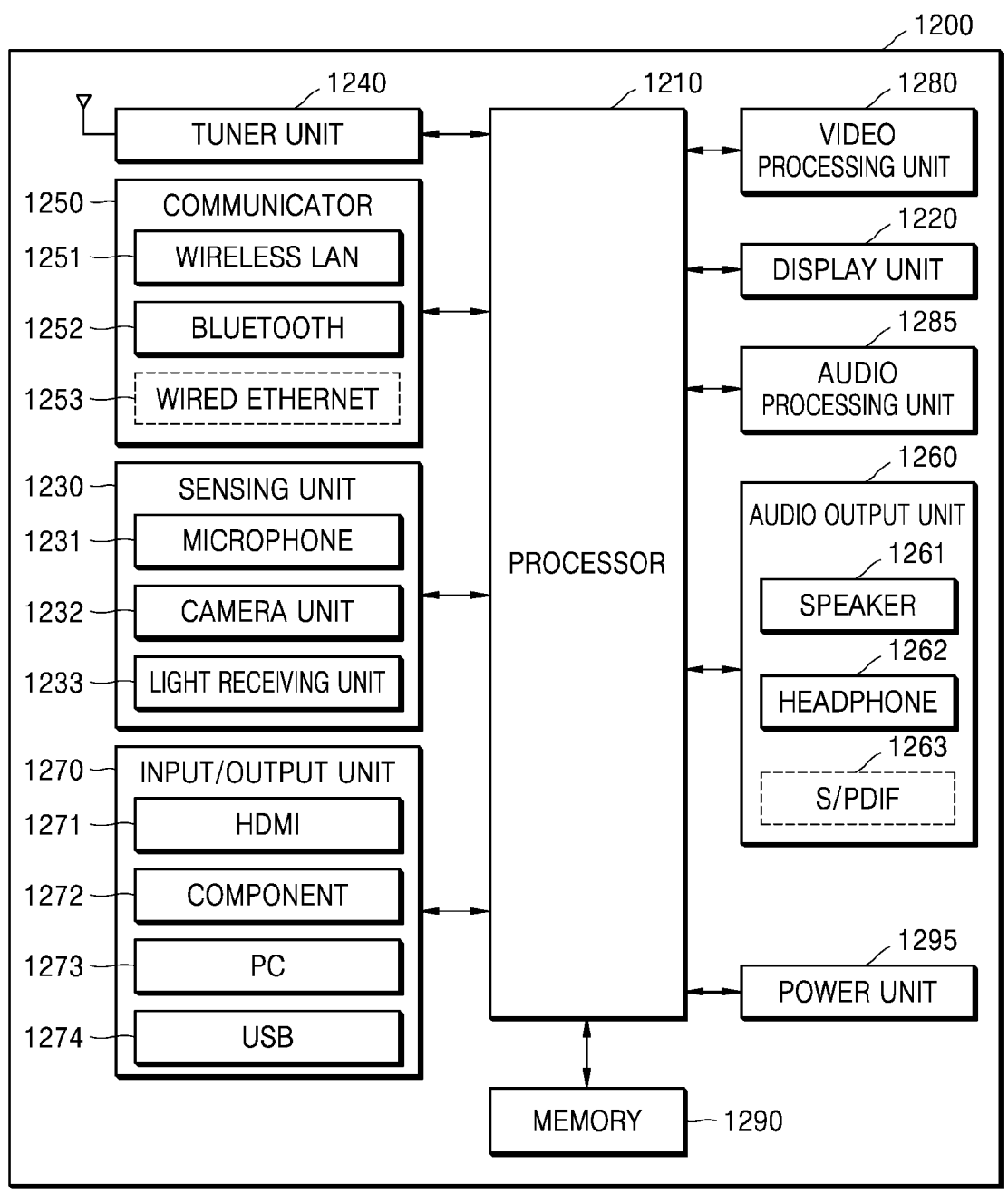
FIG. 12 is a block diagram illustrating an example configuration of a display device according to various embodiments.

FIG. 12 is a block diagram illustrating an example configuration of a display device 1200 according to various embodiments.

An electronic device 800 of FIG. 12 may be an embodiment of the display device 100 described above with reference to FIGS. 1 to 10.

Referring to FIG. 12, the display device 1200 according to an embodiment of the disclosure may include a tuner unit (e.g., including a tuner) 1240, a processor (e.g., including processing circuitry) 1210, a display unit (e.g., including a display) 1220, a communicator (e.g., including communication circuitry) 1250, a sensing unit (e.g., including at least one sensor) 1230, an input/output unit (e.g., including input/output circuitry) 1270, a video processing unit (e.g., including video processing circuitry) 1280, an audio processing unit (e.g., including audio processing circuitry) 1285, an audio output unit (e.g., including audio output circuitry) 1260, a memory 1290, and a power unit (e.g., including power supply circuitry) 1295.

As the communicator 1250, the processor 1210, the display unit 1220, and the memory 1290 of FIG. 12 may respectively correspond to the communicator 110, the processor 120, the display 130, and the memory 140 of FIG. 11, redundant descriptions thereof may not be repeated here.

The tuner unit 1240 according to an embodiment of the disclosure may include a tuner and tune and select only a frequency of a channel to be received in the display device 1200 among many wave components through amplification, mixing, resonance, and the like of a broadcast signal received in a wired or wireless manner. A broadcast signal may include audio, video and additional information, for example, electronic program guide (EPG).

The tuner unit 1240 may receive a broadcast signal from various sources such as terrestrial broadcast, cable broadcast, satellite broadcast, Internet broadcast, and the like. The tuner unit 1240 may receive a broadcast signal from a source such as analog broadcast, digital broadcast, and the like.

The communicator 1250 according to an embodiment of the disclosure may include various communication circuitry and transceive data or signals with an external device or server under the control of the processor 1210. The processor 1210 may transceive contents to an external device connected via the communicator 1250, or download an application from the external device or perform web browsing.

Furthermore, the communicator 1250 may include a module combination including any one or two or more of a wireless LAN 1251, Bluetooth 1252, and a wired Ethernet 1253.

The video processing unit 1280 may include various video processing circuitry and process video data that the display device 1200 received. In the video processing unit 1280, various image processes such as decoding, scaling, noise filtering, frame rate converting, resolution changing, and the like may be performed on the video data.

The sensing unit 1230 may include various sensing circuitry and/or sensors and sense user's voice, user's image, or user's interaction, and include a microphone 1231, a camera unit (e.g., including a camera) 1232, and a light receiving unit (e.g., including light-receiving circuitry) 1233.

The microphone 1231 may receive voice uttered by a user. The microphone 1231 may convert the received voice to an electrical signal and output the signal to the processor 1210. The user voice may include, for example, voice corresponding to the menu or function of the display device 1200.

The camera unit 1232 may include a camera and receive an image, for example, consecutive frames, corresponding to a user's motion including gesture within a camera recognition range. The processor 1210 may select a menu display on the display device 1200 using a recognition result of the received motion or control corresponding to the motion recognition result.

The light receiving unit 1233 may include various light-receiving circuitry and receive an optical signal including a control signal received from an external control device, through a light window (not shown) of a bezel of the display unit 1220, and the like. The light receiving unit 1233 may receive an optical signal corresponding to a user input from the control device, for example, a touch, a press, a touch gesture, voice, or a motion. A control signal may be extracted from the received optical signal under the control of the processor 1210.

The input/output unit 1270 may include various input/output circuitry and receive, under the control of the processor 1210, video such as a motion picture and the like, audio such as voice, music, and the like, and additional information such as EPG and the like, and the like, from the outside of the display device 1200. The input/output unit 1270 may include one of a high-definition multimedia interface (HDMI) port 1271, a component jack 1272, a PC port 1273, and a USB port 1274. The input/output unit 1270 may include a combination of the HDMI port 1271, the component jack 1272, the PC port 1273, and the USB port 1274.

The processor 1210 may include various processing circuitry and control the overall operation of the display device 1200 a signal flow between internal elements of and the display device 1200, and perform a function of processing data. When there is a user's input or a preset and stored condition is satisfied, the processor 1210 may execute operating system (OS) and various applications stored in the memory 1290.

The processor 1210 may include RAM for storing the signal or data output from the outside of the display device 1200, or used as a storage area corresponding to various jobs performed in the display device 1200, ROM for storing a control program to control the display device 1200, and a processor.

The processor 1210 may include a graphics processor (not shown). The graphics processor may generate a screen including various objects such as an icon, an image, a text, and the like, using an operating unit (not shown) and a rendering unit (not shown). The operating unit may operate attribute values such as a coordinate value, a shape, a size, a color, and the like to display respective objects according to the layout of a screen using a user input sensed through the sensing unit 1230. The rendering unit may generate a screen of various layouts including objects based on the attribute value operated by the operating unit. The screen generated by the rendering unit is displayed in a display area of the display unit 1220.

The audio processing unit 1285 may include various audio processing circuitry and process audio data. The audio processing unit 1285 may perform various processes such as decoding or amplification, noise filtering, and the like of audio data. The audio processing unit 1285 may include a plurality of audio processing modules for processing audio corresponding to a plurality of contents.

The audio output unit 1260 may include various audio output circuitry and, under the control of the processor 1210, may output audio included in a broadcast signal received through the tuner unit 1240. The audio output unit 1260 may output audio, for example, voice or sound, input through the communicator 1250 or the input/output unit 1270. Furthermore, the audio output unit 1260 may output audio stored in the memory 1290, under the control of the processor 1210. The audio output unit 1260 may include at least one of a speaker 1261, a headphone output port 1262, or a Sony/Philips digital interface (S/PDIF) output port 1263. The audio output unit 1260 may include a combination of the speaker 1261, the headphone output port 1262, and the S/PDIF output port 1263.

The power unit 1295 may include various power supply circuitry and supply power input from an external power source to elements in the display device 1200, under the control of the processor 1210. Furthermore, the power unit 1295 may supply power output from one or two or more batteries (not shown) located in the display device 1200, to internal elements, under the control of the processor 1210.

The memory 1290 may store various data, programs or applications to drive and control the display device 1200, under the control of the processor 1210. The memory 1290 may include a broadcast receiving module, a channel control module, a volume control module, a communication control module, a voice recognition module, a motion recognition module, a light receiving module, a display control module, an audio control module, an external input control module, a power control module, a power control module of an external device that is wirelessly connected, for example, through Bluetooth, a voice database (DB), or a motion database (DB), which are not illustrated. The modules and data base of the memory 1290, which are not illustrated, may be implemented by software to perform, in the display device 1200, a broadcast receiving control function, a channel control function, a volume control function, a communication control function, a voice recognition function, a motion recognition function, a light receiving control function, a display control function, an audio control function, an external input control function, a power control function, or a power control function of an external device that is wirelessly, for example, through Bluetooth. The processor 1210 may perform the respective functions using software stored in the memory 1290.

The block diagrams of the electronic devices 100 and 1200 illustrated in FIGS. 11 and 12 illustrate various example embodiments. The respective elements of the block diagrams may be integrated, added, or omitted according to the specifications of the electronic devices 100 and 1200 that are actually implemented. In other words, as necessary, two or more elements may be integrated into one element, or one element may be separated into two or more elements. Furthermore, the function performed by each block is for describing embodiments, and a detailed operation or device does not limit the scope of rights of the disclosure.

The operating method of a display device according to an example embodiment of the disclosure may be implemented in the form of program commands to be executed through various computer means and recorded on a computer-readable recording medium. The computer-readable medium may include a program command, a data file, a data structure, etc. solely or by combining the same. A program command recorded on the medium may be specially designed and configured for the disclosure or may be a usable one, such as computer software, which is well known to one of ordinary skill in the art to which the disclosure pertains to. A computer-readable recording medium may include magnetic media such as hard discs, floppy discs, and magnetic tapes, optical media such as CD-ROM or DVD, magneto-optical media such as floptical disks, and hardware devices such as ROM, RAM flash memory, which are specially configured to store and execute a program command. An example of a program command may include not only machine codes generated by a compiler, but also high-level programming language executable by an interpreter.

Furthermore, the operating method of a display device according to the disclosed embodiments may be provided by being included in a computer program product. A computer program product as goods may be dealt between a seller and a buyer.

A computer program product may include an S/W program or a computer-readable storage medium where the S/W program is stored. For example, a computer program product may include a product in the form of an S/W program, for example, a downloadable application, that is electronically distributed through a manufacturer of a broadcast receiving device or an electronic market, for example, Google PlayStore or AppStore. For electronic distribution, at least part of an S/W program may be stored in a storage medium or temporarily generated. In this case, a storage medium may be a manufacturer's server, an electronic market's server, or a storage medium of a relay server that temporarily stores a SW program.

A computer program product may include a server's storage medium or a client device's storage medium in a system including a server and a client device. Alternatively, when there is a third device, for example, a smartphone, communicatively connected to a server or a client device, the computer program product may include a storage medium of the third device. Alternatively, a computer program product may include an S/W program that is transmitted from a server to a client device or a third device, or from the third device to the client device.

In this case, server, any one of the client device and the third device may perform a method according to the disclosed embodiments by executing the computer program product. Alternatively, two or more of the server, the client device, and the third device may perform, in a distribution manner, the method according to the disclosed embodiments by executing the computer program product.

For example, a server, for example, a cloud server or an artificial intelligence server, and the like, executes a computer program product stored in the server, so that the client device communicatively connected to the server may be controlled to perform the method according to the disclosed embodiments.

A display device according to an embodiment of the disclosure may provide connection information of a peripheral device as a QR code, and by scanning the QR code using a mobile device, network and account settings of the peripheral device may be performed.

A display device according to an embodiment of the disclosure may directly perform connection to a peripheral device, and by transmitting network and account information to the connected peripheral device, network and account settings of the peripheral device may be performed.

In a display device according to an embodiment of the disclosure, peripheral devices in which network and account settings are completed may be controlled.

While the disclosure has been illustrated and described with reference to various example embodiments, it will be understood that the various example embodiments are intended to be illustrative, not limiting. It will be further understood by those of ordinary skill in the art that various changes in form and details may be made therein without departing from the true spirit and full scope of the disclosure, including the appended claims and their equivalents.

What is claimed is:

1. A display device comprising:
a display;
a communicator comprising communication circuitry;
a memory storing one or more instructions; and
a processor configured to execute the one or more instructions stored in the memory,
wherein the processor is further configured to execute the one or more instructions to:
control the communicator to perform a scanning operation to find one or more peripheral devices,
control the display to display a first graphic image representing a first peripheral device found via the scanning operation,
generate an information image based on an address information for wireless connection of the first peripheral device and a device name of the first peripheral device,
control the display to display the information image based on a user input selecting the first graphic image so that an external device recognizes the information image and performs a network setting of the first peripheral device;

based on the network setting of the first peripheral device being completed, control the display to display one or more menu items for controlling the first peripheral device; and based on a user input selecting a menu item of the menu items, control the first peripheral device so that the first peripheral device performs a function corresponding to the selected menu item, through a set network, wherein the processor is further configured to execute the one or more instructions to: determine and display positions of the first graphic image based on Received Signal Strength Indicator (RSSI) value of signal received from the found first peripheral device.

2. The display device of claim 1, wherein the processor is further configured to execute the one or more instructions to: control the display to display a connection state between the first peripheral device and the display device.

3. The display device of claim 1, wherein the processor is further configured to execute the one or more instructions to: receive, from the first peripheral device, guide information to authenticate a connection to the first peripheral device, and provide a guide to authenticate the connection to the first peripheral device based on the guide information.

4. The display device of claim 1, wherein the processor is further configured to execute the one or more instructions to: identify infrared (IR) control code information corresponding to the first peripheral device, and generate an IR control signal corresponding to connection authentication to the first peripheral device based on the identified IR control code information and control the communicator to transmit the generated IR control signal to the first peripheral device.

5. The display device of claim 1, wherein the processor is further configured to execute the one or more instructions to: control the display to display a registration completion message based on the network setting of the first peripheral device being completed and the first peripheral device being registered on a cloud server.

6. The display device of claim 1, wherein the processor is further configured to execute the one or more instructions to: control the communicator to transmit a connection request to the first peripheral device based on the address information for wireless connection of the first peripheral device and the device name of the first peripheral device, generate an IR control signal for connection authentication to the first peripheral device based on the IR control code information corresponding to the first peripheral device, transmit the IR control signal to the first peripheral device, and based on the connection to the first peripheral device being authenticated, control the communicator to transmit network and account information to the first peripheral device.

7. A method of operating a display device comprising:
perform a scanning operation to find one or more peripheral devices;
displaying a first graphic image representing a first peripheral device found via the scanning operation;
generating an information image based on an address information for wireless connection of the first peripheral device and a device name of the first peripheral device;
displaying the information image based on a user input selecting the first graphic image so that an external device recognizes the information image and performs a network setting of the first peripheral device;
based on the network setting of the first peripheral device being completed, displaying one or more menu items for controlling the first peripheral device; and
based on a user input selecting a menu item of the menu items, controlling the first peripheral device so that the first peripheral devices performs a function corresponding to the selected menu items, through a set network,
wherein the displaying of the first graphic image comprises determining and displaying positions of the first graphic image based on Received Signal Strength Indicator (RSSI) value of signal received from the found first peripheral device.

8. The method of claim 7, wherein the displaying of the first graphic image comprises displaying a connection state between the first peripheral device and the display device.

9. The method of claim 7, further comprising:
receiving, from the first peripheral device, guide information to authenticate a connection to the first peripheral device; and
providing a guide to authenticate a connection to the first peripheral device based on the guide information.

10. The method of claim 7, further comprising:
identifying infrared (IR) control code information corresponding to the first peripheral device; and
generating an IR control signal corresponding to connection authentication to the first peripheral device based on the identified IR control code information and transmitting the generated IR control signal to the first peripheral device.

11. The method of claim 7, further comprising displaying a registration completion message based on the network setting of the first peripheral device being completed and the first peripheral device being registered on a cloud server.

12. The method of claim 7, further comprising:
transmitting a connection request to the first peripheral device based on the address information for wireless connection of the first peripheral device and the device name of the first peripheral device;
generating an IR control signal for connection authentication to the first peripheral device based on the IR control code information corresponding to the first peripheral device, and transmitting the generated IR control signal to the first peripheral device; and
based on the connection to the first peripheral device being authenticated, transmitting network and account information to the first peripheral device.

13. One or more non-transitory computer-readable recording media having stored therein a program to perform the method of claim 7.

* * * * *